US007436354B2

(12) United States Patent
Lee

(10) Patent No.: US 7,436,354 B2
(45) Date of Patent: Oct. 14, 2008

(54) METHODS AND SYSTEMS FOR MOBILE NAVIGATIONAL APPLICATIONS USING GLOBAL NAVIGATION SATELLITE SYSTEMS

(75) Inventor: Young Chang Lee, Fairfax, VA (US)

(73) Assignee: The MITRE Corporation, McLean, VA (US)

( * ) Notice: Subject to any disclaimer, the term of this patent is extended or adjusted under 35 U.S.C. 154(b) by 120 days.

(21) Appl. No.: 11/516,747

(22) Filed: Sep. 7, 2006

(65) Prior Publication Data
US 2008/0062041 A1 Mar. 13, 2008

(51) Int. Cl.
*G01S 1/00* (2006.01)
(52) U.S. Cl. .............................. 342/357.02; 342/357.06
(58) Field of Classification Search ............ 342/357.02, 342/357.06, 357.14, 357.17; 701/213, 215, 701/301
See application file for complete search history.

(56) References Cited
U.S. PATENT DOCUMENTS

| | | | | |
|---|---|---|---|---|
| 6,377,892 | B1 * | 4/2002 | Johnson et al. | 701/213 |
| 6,847,893 | B1 * | 1/2005 | Lupash | 701/213 |
| 6,856,905 | B2 * | 2/2005 | Pasturel et al. | 701/214 |
| 6,864,836 | B1 * | 3/2005 | Hatch et al. | 342/357.15 |
| 7,064,706 | B2 * | 6/2006 | King et al. | 342/357.02 |

OTHER PUBLICATIONS

Lee, Dr. Young C. et al., "GPS and Galileo with RAIM or WAAS for Vertically Guided Approaches," Proceedings of the 18th International Technical Meeting of the Satellite Division of The Institute of Navigation (ION GNSS 2005), Sep. 15, 2005, (25 pages), Long Beach, California, United States.

Lee, Dr. Young Chang, "A New Improved RAIM Method Based on the Optimally Weighted Average Solution (OWAS) Under the Assumption of a Single Fault," Proceedings of the Institute of Navigation 2006 National Technical Meeting (ION NTM 2006), Jan. 19, 2006, (13 pages), Monterey, California, United States.

* cited by examiner

*Primary Examiner*—Dao L Phan
(74) *Attorney, Agent, or Firm*—Sterne, Kessler, Goldstein & Fox PLLC

(57) ABSTRACT

The present invention relates to providing navigation guidance for mobile users, using Global Navigation Satellite Systems (GNSSs) for applications where the user position needs to be determined in real time while meeting the navigation requirements, especially integrity requirement, for the given application. The present invention assists in providing guidance with a high availability of integrity function by trading accuracy for integrity for two different types of navigation applications. A first type of application requires a capability of detecting an occurrence of multiple satellite signal faults; the first embodiment of the invention provides this capability with a high availability of integrity, using two or more independent GNSSs. A second type of application requires a capability of detecting an occurrence of a single satellite signal fault; the second embodiment of the invention provides this capability with a high availability of integrity, using any one or a combination of GNSSs. The detecting and deriving of both methods are (i) in position domain and (ii) determinative of mobile user safety.

28 Claims, 14 Drawing Sheets

Continue to FIG. 11B

METHODS AND SYSTEMS FOR MOBILE NAVIGATIONAL APPLICATIONS USING GLOBAL NAVIGATION SATELLITE SYSTEMS

BACKGROUND OF THE INVENTION

1. Field of the Invention

The invention relates to navigational guidance for mobile users, using Global Navigation Satellite System(s) (GNSSs).

2. Background Art

GNSSs include the Global Positioning System (GPS) developed by the United States Air Force, Global Navigation Satellite System (GLONASS) developed in Russia, which is under needed improvements, Galileo under development in Europe, and possibly other systems such as Compass, currently under consideration in China. However, GPS has been the only complete system and has been widely used in aviation for a number of years. Among these other systems, the implementation of Galileo is promising in the near future. When Galileo becomes fully operational, GPS and Galileo may be used together to improve the navigational performance of mobile users anywhere in the world.

As known in the art, GPS, as will Galileo, provides highly accurate position and velocity information and precise time continuously to an unlimited number of users throughout the world. However, GPS alone, without any other augmentation, lacks a capability known as integrity. That is, if a satellite fault occurs, GPS cannot inform the user of the fault in a timely manner. The integrity issue is critical for aviation because lack of this capability can directly lead to a situation in which safety may be compromised. One important method to provide the integrity for GPS in civil aviation applications is known in the art as Receiver Autonomous Integrity Monitoring (RAIM).

A GPS user receiver only requires four satellites for its position determination; however, five or more satellites are typically visible from any location, thus making redundant GPS measurements available. If redundant measurements are available (i.e., if five or more satellites are visible), a consistency check may be performed among the different satellite range measurements to determine if any of the satellites are faulty with an unusually large ranging error. The idea is that if no satellite is faulty (i.e., has an unusually large ranging error), it is likely that the measurements are consistent. If any one of the satellites is faulty, having an unusually large ranging error, the measurements would not be consistent with each other.

RAIM is essentially an intuitive formulation and can be used for fault detection in navigation applications. The degree with which RAIM detects faults depends on the user-to-satellite geometry formed by visible satellites. RAIM performance is dependent upon position error not exceeding levels for safe operation. RAIM performance is also a function of Pr{Hazardously Misleading Information (HMI)}, which is a probability that the position error exceeds the required alert limit without a timely warning to the pilot. The fraction of time in which integrity monitoring can be provided for a given alert limit, satisfying the Pr{HMI} requirements, is called the availability of RAIM. For many mobile navigation applications, especially for air navigation, RAIM availability of many 9's (i.e., 0.999...) is required. However, this requirement is often difficult to achieve for GNSS navigation applications that would provide significant operational benefits. For this reason, effective RAIM methods that provide high availability are always sought after.

RAIM typically refers to a fault detection (FD) function, which determines the presence or absence of a fault that could cause HMI. Sometimes, however, RAIM is used to refer to the fault detection and exclusion (FDE) function as well. Upon detection of a fault by the FD function, the FDE function is activated and attempts to identify and exclude the source (e.g., a satellite) of the HMI. For this reason, while RAIM FD is related to integrity, the FDE function is related to continuity of navigation. An FDE technique is derived by extending a RAIM detection method, as will be briefly described later. However, in general, the user-to-satellite geometry must satisfy much more stringent criteria for the FDE function to be available than for the RAIM detection function.

What is highly desirable, therefore, are RAIM methods that provide improved availability for their respective applications over the existing RAIM methods. The present invention achieves this goal by trading accuracy for integrity.

BRIEF SUMMARY OF THE INVENTION

The present invention relates to providing navigation guidance for mobile users, using GNSSs. The invention can apply to applications where the user position needs to be determined while meeting the navigation requirements for the given application, especially accuracy and integrity. A mobile user can be any system that moves, such as aircraft, ships, land vehicles and even space vehicles. While the invention can be used in a wide variety of applications, it is described in the present application within the context of air navigation.

The present invention uses GNSS(s) to assist in providing guidance with a sufficiently high level of integrity for two different types of navigation applications. The first type is one in which the probability of multiple satellite faults simultaneously occurring cannot be neglected. This type of application includes air navigation, more specifically, vertically guided aircraft approaches such as localizer performance with vertical guidance (LPV) and approach with precision vertical guidance (APV)-II. It also includes the future precision approaches equivalent to that of the guidance-provided by the Instrument Landing System (ILS).

The second type of application is one in which the probability of multiple satellite faults simultaneously occurring can be neglected. This type of application includes air navigation in non-precision approach (NPA), terminal, and en route phases of flight.

Consistent with the principles of the present invention, a first embodiment of the present invention includes detecting an occurrence of one or more satellite signal faults in either one of the two independent GNSSs (or two groups of independent GNSSs if more than two GNSSs are used) and deriving protection levels (PLs), trading accuracy for integrity. The detecting and deriving are (i) in the position domain and (ii) determinative of mobile user safety.

The first embodiment of the present invention can be used for the first type of application discussed above and will be referred to herein as the Optimally Weighted Average Solution (OWAS)-2. OWAS-2 provides integrity, using two or more independent GNSSs, for mobile user navigational applications in which the probability of multiple satellites simultaneously occurring within a constellation cannot be neglected. One example of such an application is vertically guided approaches, in which both vertical and horizontal navigation guidance must be provided with tight alert limits.

These alert limits are tight enough such that the probability of faults simultaneously occurring in two or more satellites to cause HMI with the position errors exceeding the alert limits cannot be neglected. Therefore, the OWAS-2 technique requires two independent GNSSs (or two groups of independent GNSSs) and assumes that multiple satellite faults may occur at any given time within a GNSS constellation. On the other hand, it is assumed that the probability of multiple satellite faults simultaneously occurring across any two independent constellations can be neglected as will be shown later. In the description of the first embodiment of the present invention, GPS and Galileo are to be used as two independent GNSSs as an example.

A second embodiment of the present invention includes a method for facilitating mobile navigation using one or more GNSSs. This embodiment is described using an example of air navigation in NPA, terminal, and en route phases of flight, in which only horizontal guidance is required. The method includes detecting an occurrence of a satellite signal fault in a GNSS constellation and deriving cross-track (XPL) and along track (APL) protection levels by trading accuracy for integrity. The detecting and deriving are (i) in position domain and (ii) determinative of mobile user safety.

The second embodiment of the present invention is intended to be used for the second type of application discussed above and will be referred to herein as OWAS-1. OWAS-1 provides integrity for mobile navigation for applications with alert limits that are large enough such that the probability of faults simultaneously occurring in two or more satellites to cause HMI with the position errors exceeding the alert limits is negligible. Therefore, the OWAS-1 technique assumes that only up to a single satellite fault may occur at any given time. Additionally, the OWAS-1 technique does not require more than a single GNSS. If more than one GNSS is available, they are combined and treated as a single constellation, in which occurrence of every satellite fault is independent from each other.

In short, the present invention improves the availability of the integrity function in navigation guidance for either type of the applications described above. The present application uses vertically guided approaches as an example of the first type and en route, terminal, and NPA phases of flight as an example of the second type. The invention, however, is not limited to these examples.

Further features and advantages of the present invention are provided as well as the structure and operation of various embodiments of the present invention, as described in detail below with reference to the accompanying drawings.

BRIEF DESCRIPTION OF THE DRAWINGS/FIGURES

The accompanying drawings, which are incorporated herein and constitute part of the specification, illustrate embodiments of the present invention and, together with the general description given above and the detailed description of the embodiments given below, serve to explain the principles of the invention. In the drawings.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appending claims.

It will be apparent to one skilled in the art that the present invention, as described below, may be implemented in many different embodiments. Any actual software code implementing the present invention is not limiting of the present invention. Thus, the operational behavior of the present invention will be described with the understanding that modifications and variations of the embodiments are possible, given the level of detail presented herein.

In the present application, RAIM is used to refer to FD, and FDE will be differentiated as such. The implementation of both RAIN FD and FDE is by means of software inside of the navigation processor that is part of the GNSS user receiver.

The first embodiment of the present invention enhances the capability to use RAIM for both horizontal and vertical guidance during instrument approach, for example. For example, the OWAS-2 RAIM method of the present invention enables both GPS and Galileo to provide an extended capability to detect multiple satellite signal faults in either constellation. More specifically, the present invention brings together the best features of previous versions of RAIM methods and implements these methods in the position domain.

Figure 1:
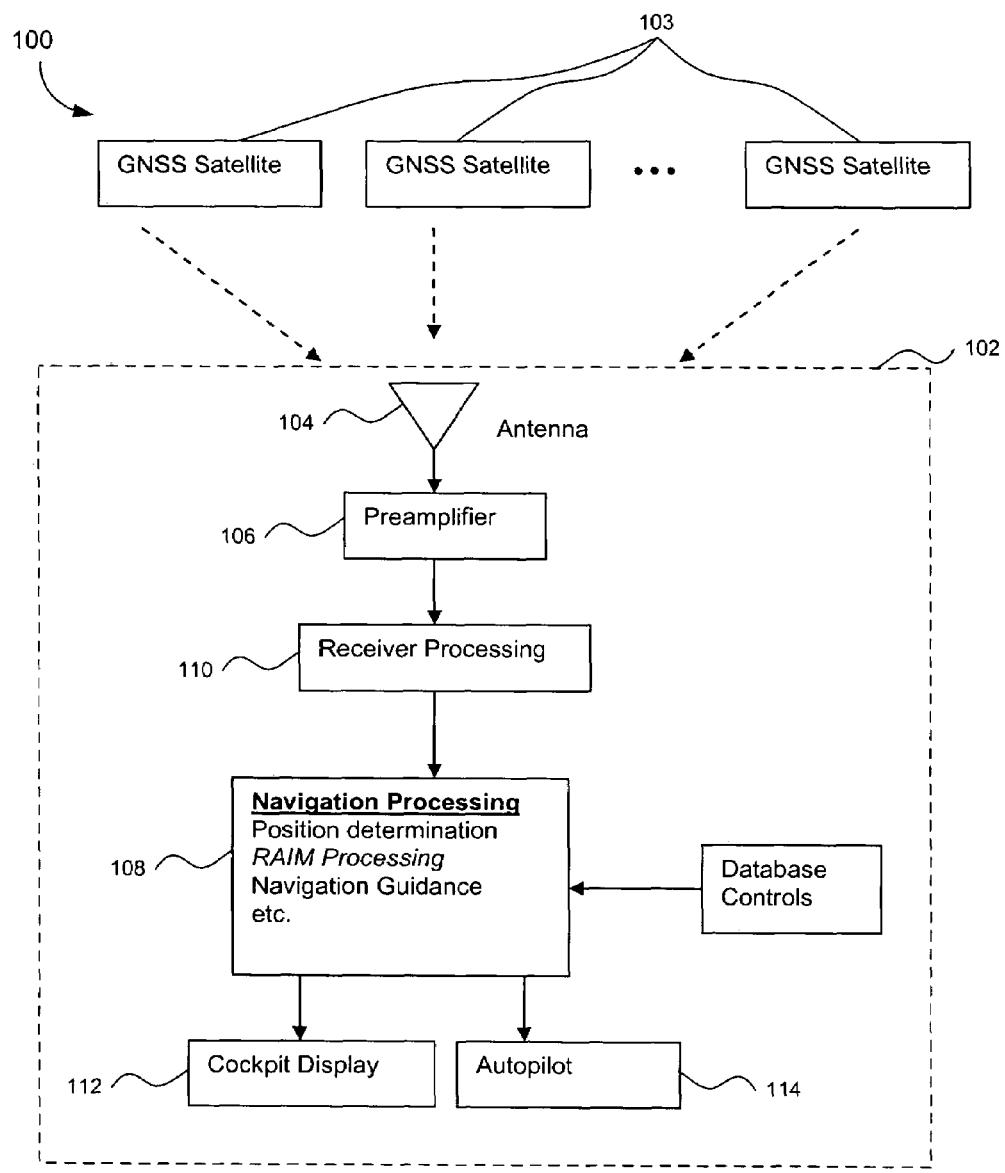
FIG. 1 is a top-level functional block diagram of a GNSS receiver wherein a RAIM system can be implemented in accordance with the present invention.

FIG. 1 is a top-level functional block diagram of a GNSS receiver wherein a RAIM system can be implemented in accordance with the present invention 100. A GNSS user receiver 102 receives ranging signals from GNSS satellites 103 in view through an antenna 104. The GNSS user receiver 102 includes traditional receiver system components such as the antenna 104 and a preamplifier 106, etc., which are all well known to those of skill in the art. The GNSS receiver 102 for aviation also includes a navigation processor 108 for processing pseudo-range measurements received from a GNSS receiver processing unit 110. The navigation processor 108 can perform position determination, navigation guidance, and RAIM processing functions. By way of example, the present invention can be implemented within the navigation processor 108 as easily as conventional RAIM implementations.

In the example shown assuming an air navigation application, a database control allows the user to enter user input and the navigation processor output may be output to a cockpit display 112 or to an autopilot 114

FIG. 1 is presented herein as merely an example of one configuration in which RAIM may be implemented. The present invention, however, is not limited to the implementation illustrated in FIG. 1.

Integrity Requirement

Alert Limits. The horizontal and vertical alert limits (HAL and VAL) define maximum navigation sensor errors (NSE) allowed for safe navigation for a given type of flight. These limits apply to the total NSE, including all errors resulting from signal-in-space, airborne receiver, ionosphere delay, and troposphere delay. Violation of these limits without warning to the user is considered to be HMI from the navigation system to the user.

For applications of the first embodiment of the present invention (OWAS-2), user equipment desirably determines two sets of parameters. One set of parameters is for vertical and horizontal protection levels (VPL and HPL), which are high-probability upper bounds on the vertical and horizontal NSE, respectively according to the integrity requirement for a given operation. VPL and HPL are compared to VAL and HAL specified for a given operation (e.g., a vertically guided approach). If either VPL>VAL or HPL>HAL, the user is alerted that RAIM is not available. If RAIM is not available, then the user has to take an appropriate measure according to a given operational procedure. The other set of parameters is for the test statistics to detect a fault. If either of the test statistics (one for vertical and the other for horizontal) exceeds its fault detection threshold, the FDE function may be activated to attempt to exclude the bad satellite(s). However, isolation of and exclusion of multiple bad satellites is quite unreliable for tight alert limits in general, such as those for vertically guided approaches.

If the fault(s) cannot be excluded and/or navigation cannot continue with the remaining satellites, the user is alerted that a fault has been detected. When a fault is detected, then the user is required to take an appropriate action according to a given operational procedure, which could be either executing a missed approach or, if possible, reverting to an instrument approach with greater alert limits to the same runway.

For applications of the second embodiment of the present invention (OWAS-1), user equipment desirably determines the same sets of parameters as with OWAS-2, but for the example of air navigation in NPA, terminal, and en route phases of flight, the parameters are determined only with respect to the horizontal position. The pilot has to take an appropriate action according to a given operational procedure where the pilot is alerted with either a "no RAIM" or a "fault detection" message. As stated earlier, for applications in which OWAS-1 is used, only up to a single satellite fault is assumed at any given time. With this assumption and with comparatively large alert limits for en route through NPA phases of flight, availability of the FDE function associated with OWAS-1 is typically high such that it would be worthwhile to execute the FDE function.

The first embodiment of the present invention can be used for the vertically guided approaches. The performance of this invention can be measured by the availability achieved for a particular value of VAL. Desirable ranges of interest are 20 m$\leq$VAL$\leq$35 m. The minimum value of VAL is specified for APV-II. The maximum VAL of 35 m is for LPV presently being considered for the Wide Area Augmentation System (WAAS).

Figure 2:
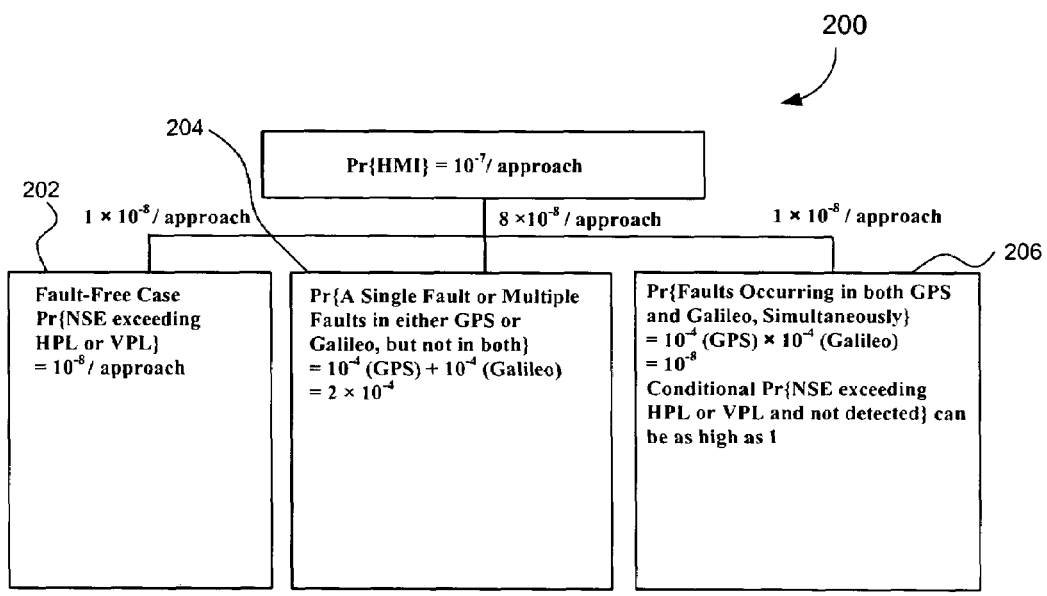
FIG. 2 is an illustration of an exemplary top-level fault tree used in a first embodiment of the present invention.

FIG. 2 is an illustration of an exemplary top level signal-in-space integrity fault tree 200 used in the first embodiment of the present invention. The fault tree is used to determine the allocation of the overall integrity risk for all the various cases that RAIM has to handle for vertically guided approaches.

Integrity Risk. The International Civil Aviation Organization (ICAO) Annex 10 states that the Category (CAT) I integrity risk, defined as the probability of HMI resulting from undetected signal-in-space errors, is Pr{HMI} less than or equal to $2\times10^{-7}$ per approach. For a future system, the target for Pr{HMI} is assumed to be less than or equal to $1\times10^{-7}$ per approach.

The fault scenarios considered in FIG. 2 include three cases: i) fault-free case 202, ii) a single fault or multiple faults in either but not both of the GPS and Galileo constellations 204, and iii) simultaneous faults in both GPS and Galileo 206. The probability of occurrence of HMI is allocated for each case such that the sum of all three is equal to the total Pr{HMI} requirement. Within each case, the integrity risk is further allocated between vertical and horizontal HMI. Ninety percent of the integrity risk is allocated to the two fault cases 204 and 206 because faults are usually the dominant cause of HMI.

In FIG. 2, a fault-free case 202 covers the causes of HMI that are due to large random errors that can occur with small probability in the normal operation of the system, such as those due, for example, to noise and multi-path.

The fault case 204 includes a single fault or a common-mode fault affecting multiple faults in only GPS or only Galileo, but not in both. The capability of detecting simultaneous errors resulting from a common-mode fault has been considered unnecessary until now because RAIM has been used thus far only for the en route, terminal, and NPA phases of flight, for which the alert limits are relatively large. The probability of having large errors on multiple satellites simultaneously, such that it would cause an HMI event against the relatively large alert limits, is considered negligible.

However, for applications with tight alert limits such as those for vertically guided approaches, even when the ranging errors for individual satellites are not unusually large, an HMI event may result when multiple satellites are involved. (For example, if all the range measurements are consistent with an erroneous earth orientation, then the resulting errors exceeding the tight alert limits for vertically guided approaches are undetectable by the conventional RAIM techniques.) Therefore, the probability of a common-mode fault within one constellation that may affect multiple satellites 204 cannot be neglected. For this reason, consideration of the possibility of HMI results involving multiple satellites simultaneously is required for such applications as the vertically guided approaches. While conventional RAIM techniques cannot be assured to detect simultaneous errors, the improved RAIM technique of the first embodiment of the present invention can accommodate multiple faults by working with two independent constellations.

The fault case 206 includes simultaneous faults in GPS and Galileo. The faults 206 that occur in both GPS and Galileo must be independent events, and therefore, one can show as follows that the probability of such faults occurring simultaneously is sufficiently small to meet the allocated integrity risk requirement. In both constellations, it is assumed that the probability of a fault in each constellation is $10^{-4}$. The probability of simultaneous faults in both GPS and Galileo is taken as $(10^{-4})^2=10^{-8}$ since the constellations (e.g, GPS and Galileo) are operated independently. This probability meets the allocated integrity risk of $10^{-8}$/approach even if it is conservatively assumed that the conditional probability of not detecting simultaneous faults in both constellations can be equal to one.

Availability

In estimating the performance of RAIM, availability is defined as the average fraction of time that VPL≦VAL and HPL≦HAL subject to meeting the accuracy requirement as well. ICAO Annex 10 recommends availability to be in the range of 0.99 to 0.99999. A particular value of availability depends upon operational need.

Enhanced RAIM

An enhanced version of RAIM is provided in a first embodiment of the present invention. The enhanced RAIM will be referred herein to as the Optimally Weighted Average Solution (OWAS), more specifically OWAS-2, to distinguish this first embodiment of the present invention from the second embodiment of the invention called OWAS-1. OWAS-2 was primarily developed for application to a combined GPS/Galileo position solution that would be used for vertically guided approaches; however, the technique is not limited to these applications. OWAS-2 is based on the salient features of two recently developed RAIM methods known by those of skill in the art as the Group Separation (GS) method and NIORAIM.

By way of background, the GS method was devised to provide an improved RAIM when GPS and Galileo would be used in a combined position solution for vertically guided approaches. The advantage of the GS method over the conventional RAIM methods is the ability to handle multiple faults within either the individual GPS or Galileo constellations. Therefore, the GS method can be used for vertically guided approaches that require a capability to detect simultaneous multiple faults.

Figure 3:
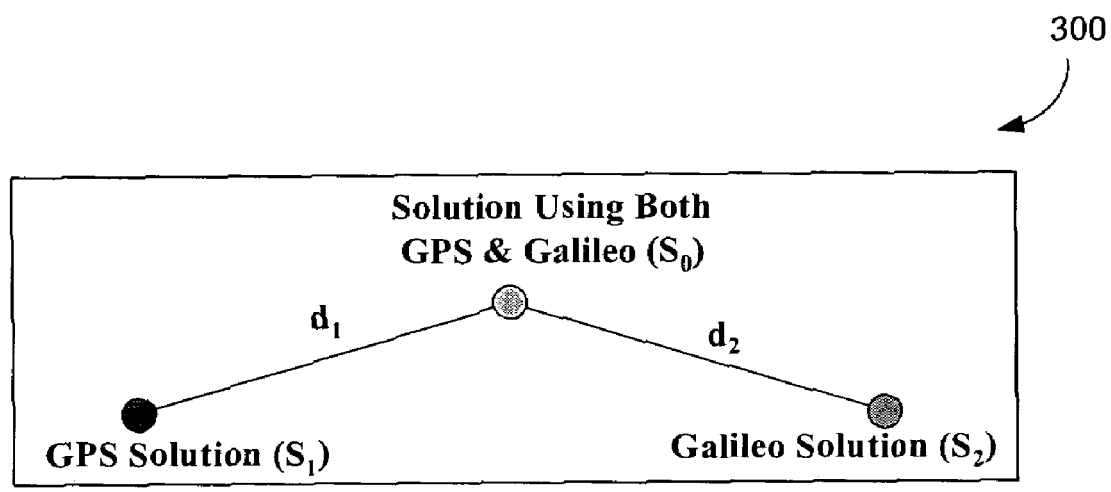
FIG. 3 is an illustration of a Group Separation (GS) method from which the present invention evolved.

FIG. 3 is an illustration of the GS technique 300 from which the first embodiment of the present invention evolved. As seen in FIG. 3, the GS method works with three user position solutions: $S_1$ using GPS satellites, $S_2$ using Galileo satellites, and $S_0$, using GPS and Galileo satellites together. In the technique 300, the separation distance between $S_1$ and $S_0$ ($d_1$) and the separation between $S_2$ and $S_0$ ($d_2$) constitute two test statistics. A detection threshold ($T_1$ or $T_2$) for each of these test statistics is determined on the basis of the maximum allowable false alert probability, which, in turn, is derived from the allocated continuity risk requirement.

When determining a protection level, error boundaries $a_1$ and $a_2$ are added to protect against any masking of fault detection by the fault-free errors (e.g., receiver noise and multipath). That is, $a_1$ and $a_2$ bound the respective position solution errors with a probability that, in combination with an a priori rate of occurrence of a fault, would meet the integrity requirement. The probability is determined as follows. For example, if the integrity requirement is $8 \times 10^{-8}$ (see FIG. 2) and a fault is assumed to occur at a rate of $10^{-4}$, the probability must be at least 0.9992. Then, VPL is given by VPL=max {$VPL_1, VPL_2$}, where $VPL_1$ and $VPL_2$ are ($T_1+a_1$) and ($T_2+a_2$), respectively. Likewise, HPL=max {$HPL_1, HPL_2$}.

The GS technique 300 works regardless of how many satellites are faulty in either the GPS or Galileo at any given time. While the GS technique 300, unlike other RAIM methods, provides a measure of multiple fault capability, which is needed, for example, for vertically guided approaches, it does not deliver sufficiently high availability.

NIORAIM was devised by modifying one of the conventional RAIM methods called a least-squares residual (LSR) method to improve RAIM availability. The LSR method determines a protection level (e.g., HPL) on the basis of the maximum slope in a plot 400 of position error 402 versus a test statistic 404, as illustrated in FIG. 4.

Figure 4:
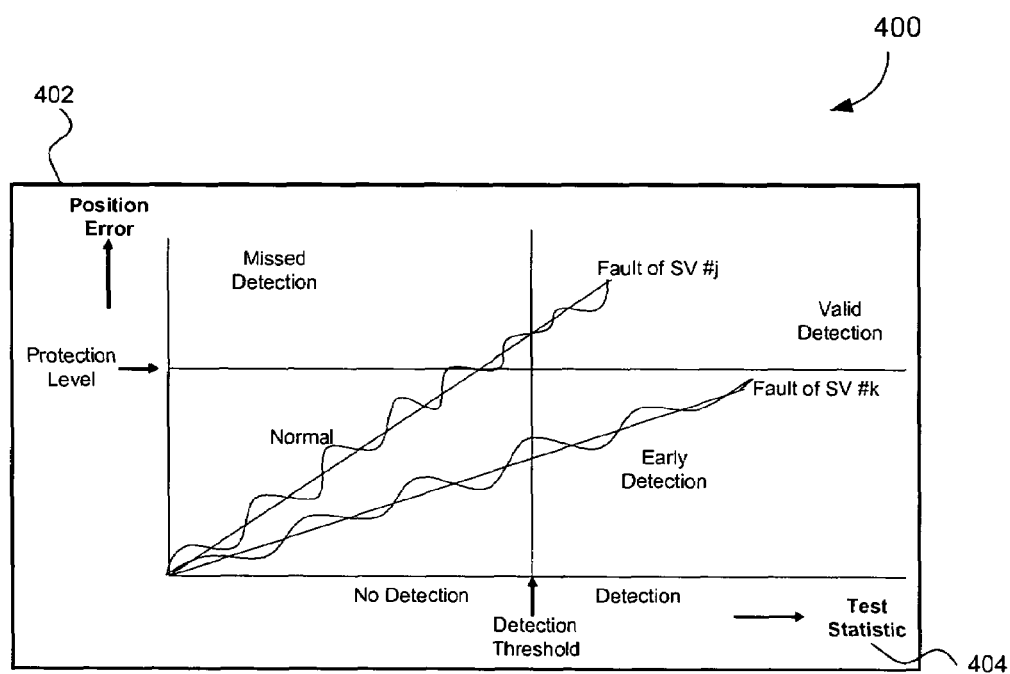
FIG. 4 is an illustration of the Least-Squares Residual (LSR) method which is a conventional technique from which the present invention indirectly evolved.

In the plot 400 of FIG. 4, a maximum slope must be selected in calculation of a protection level to ensure that integrity is provided regardless of which satellite fails. If the maximum slope can be reduced, the protection level would be reduced, and thus RAIM availability would be improved. NIORAIM reduces the maximum slope by applying additional weights that are superimposed on the weights that are applied to individual satellite range measurements in a conventional weighted least-squares solution. However, it is a formidable task to determine, in real time, an optimal set of artificial weights that would reduce the maximum slope to the maximum extent possible. For this reason, NIORAIM employs a numerical method involving extensive off-line Monte-Carlo simulation to create a look-up table. Interpolation of the look-up table is used during navigation in determining optimal weights for improving integrity availability. A characteristic of this method is that the improvement in availability of integrity is obtained at the expense of degrading navigation accuracy. NIORAIM works under the assumption of a single fault at a time, just as with any other conventional RAIM method.

OWAS-2 Technique

Figure 5:
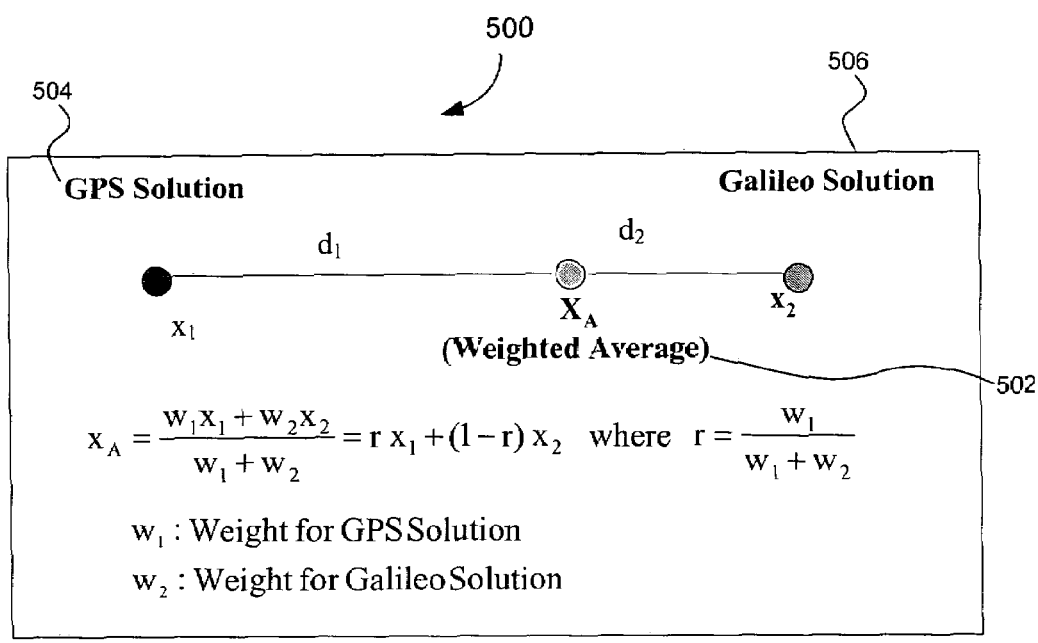
FIG. 5 is an illustration of the basic concept of OWAS-2, the first embodiment of the present invention.

FIG. 5 is an illustration of an OWAS-2 method 500 used in the first embodiment of the present invention. OWAS-2 works with two independent constellations (or two groups of independent GNSS constellations if more than two GNSSs are used), such as GPS and Galileo, and provides integrity monitoring in the presence of a single satellite fault or a common mode fault affecting multiple satellites in either one of the two constellations. As shown in FIG. 5, OWAS-2 is a modification of the GS method through using the weighting concept of NIORAIM, but in the position domain. Specifically, the navigation solution is a weighted average 502 of two individual GPS and Galileo solutions, 504 and 506, instead of a combined solution using all the range measurements from GPS and Galileo satellites together. A weighted average of the two position solutions is represented by $$x_A = \frac{w_1 x_1 + w_2 x_2}{w_1 + w_2} \quad (1)$$
$$= \left(\frac{w_1}{w_1 + w_2}\right) x_1 + \left(\frac{w_2}{w_1 + w_2}\right) x_2$$
$$= r x_1 + (1-r) x_2$$

where $$r \equiv \left(\frac{w_1}{w_1 + w_2}\right) \quad (2)$$

With this formulation, the next step is to find an optimal weight ratio that satisfies the criteria for RAIM to be available as much as possible while taking into account the accuracy requirements for both vertical and horizontal positions. The accuracy is expressed by the standard deviation ($\sigma_V$) for the vertical position and the root-mean-square error ($d_{rms}$) for the horizontal position. In our example, the horizontal position error is assumed to have a two-dimensional Gaussian distribution, and as a conservative estimate of $d_{rms}$, the standard deviation of the horizontal position error along the major axis of the assumed Gaussian bivariate error ellipse ($d_{major}$) is used.

The criteria for $\sigma_V$ and $d_{major}$ are derived from the operational requirements:

(a) 95$^{th}$ percentile NSE bound for vertical and horizontal position error (b) NSE bound to meet integrity in a fault-free case against vertical and horizontal alert limits, respectively.

From these two requirements, it follows that the maximum allowable values of $\sigma_V$ and $d_{major}$, ($\sigma_{V\text{-}max}$, $d_{major\text{-}max}$) are determined.

By adding the integrity availability requirements for protection levels, OWAS-2 RAIM is available if all of the following four conditions are satisfied:

$\sigma_V \leq \sigma_{V\text{-}max}$, $d_{major} \leq d_{major\text{-}max}$ (accuracy) and VPL$\leq$VAL, HPL$\leq$HAL (integrity availability).

The OWAS-2 process is described in greater detail below. Because the processes between the vertical and horizontal positions are quite similar, they are described primarily for the vertical position. Any difference for the horizontal position will be noted. As a preliminary matter, OWAS-2 is a technique that can be used to determine an optimal weight ratio that would satisfy all of the above criteria to the extent possible.

An initial step in the OWAS-2 process is determining a weight ratio (r) that minimizes VPL. Just as in the GS method above, $$\text{VPL} = \max\{\text{VPL}_1, \text{VPL}_2\} \quad (3)$$

Figure 8:
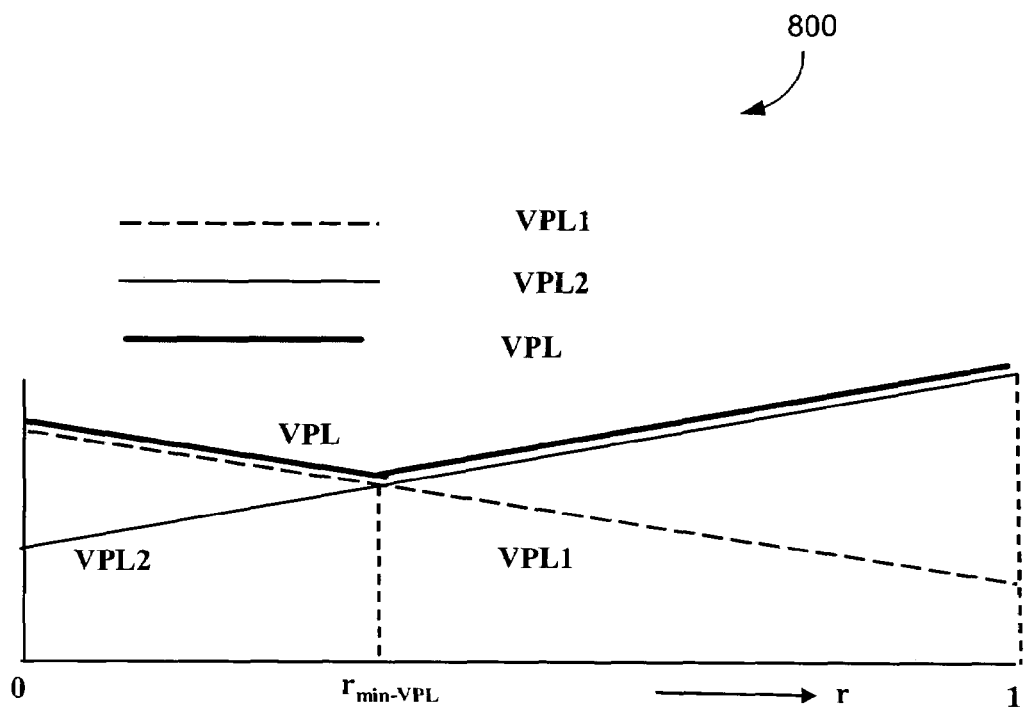
FIG. 8 is a graphical illustration of how a protection level (e.g., the vertical protection level shown as an example) varies as a function of weight ratio.

VPL$_1$ and VPL$_2$ can be expressed as linear functions of the weight ratio r as illustrated in FIG. 8, and therefore, according to Eq. (3), VPL is a minimum when VPL$_1$=VPL$_2$. From this condition, an optimal weight ratio giving the smallest VPL magnitude can be derived.

Figure 6:
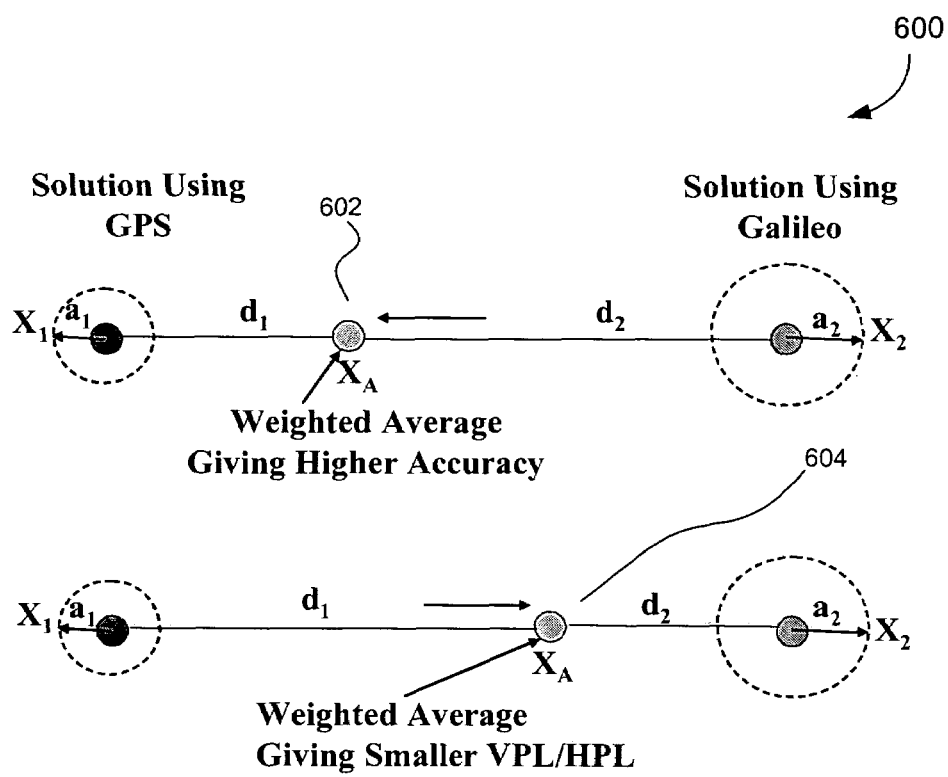
FIG. 6 is an illustration of the trade-off between accuracy and protection level that can be achieved by varying weights in relation to the illustration in FIG. 5.

The trade-off between accuracy and integrity is illustrated in a graph 600 in FIG. 6. In the example of FIG. 6, the uncertainty associated with the Galileo position solution is assumed to be larger than that of the GPS solution. In this example, it can be seen that a solution with higher accuracy can be obtained by giving more weight to the more accurate GPS solution, which moves a weighted average solution X$_A$ (602) toward the GPS solution. On the other hand, the smallest VPL is obtained by giving more weight to the Galileo solution so that VPL$_1$ and VPL$_2$ can be made equal, which would move a weighted average solution X$_A$ (604) toward the Galileo solution. From this observation, it is apparent that the smallest VPL is obtained at the expense of a degraded accuracy of the navigation solution.

Because a smaller VPL and thus a higher availability of the integrity function are obtained at the expense of a degraded accuracy of the navigation solution, it is desirable to ensure that the accuracy requirement is also met when weighting a position solution to decrease a protection level. It is shown later that both VPL and variance, $\sigma_v^2$, representing the accuracy of the vertical position error (in the absence of a fault condition) are functions of the weigh ratio.

Figure 7:
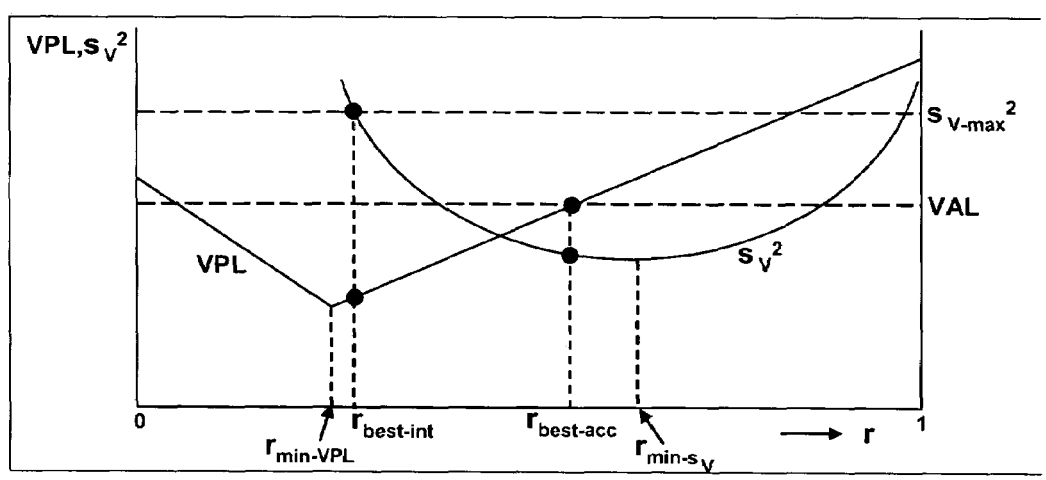
FIG. 7 is an illustration of obtaining optimum weights in accordance with the illustration in FIG. 5.

In general, the weight ratios that minimize $\sigma_v$ or VPL are not the same as illustrated in FIG. 7 and discussed in greater detail below. Therefore, one should determine a single weight ratio that would represent the best compromise between minimizing the VPL and maximizing the accuracy (or equivalently minimizing $\sigma_V$) for vertical position.

FIG. 7 is a graphical illustration 700 of how the optimal weight ratio is determined. In FIG. 7, weight ratio $r_{min\text{-}VPL}$ minimizes VPL, but does not meet the criterion for $\sigma_v$; whereas weight ratio $r_{min\text{-}\sigma V}$ minimizes $\sigma_v$, but does not satisfy VPL$\leq$VAL. FIG. 7 also illustrates two ways of selecting a weight ratio that would satisfy both the accuracy and integrity availability requirements:

(i) $r_{best\text{-}int}$ minimizes VPL to the extent possible while still meeting the accuracy requirement $\sigma_v \leq \sigma_{v\text{-}max}$ (ii) $r_{best\text{-}acc}$ minimizes $\sigma_v$ to the extent possible while still meeting the integrity availability requirement VPL$\leq$VAL.

Detailed expressions for OWAS-2 are provided below. First, expressions for covariance matrices used in the subsequent equations are derived. Second, equations for VPL are derived as a function of their weight ratios. Third, equations for $\sigma_V$ are derived as functions of their weight ratios. Finally, it is shown how to determine an optimal weight ratio that satisfies both the integrity availability and accuracy requirements for RAIM according to the selection between minimizing VPL and minimizing $\sigma_V$.

Derivation of Covariance Matrices for OWAS-2

As described earlier in conjunction with FIG. 5, the OWAS-2 position solution is a weighted average of the GPS and Galileo solutions. That is, $$x_A = \frac{w_1 x_1 + w_2 x_2}{w_1 + w_2}$$
$$= \left(\frac{w_1}{w_1 + w_2}\right)x_1 + \left(\frac{w_2}{w_1 + w_2}\right)x_2$$
$$= rx_1 + (1-r)x_2$$

where $$r \equiv \left(\frac{w_1}{w_1 + w_2}\right) \quad (6)$$

Note that from the definition of r in (6), the following must hold:

$$0 \leq r \leq 1 \quad (7)$$

The position error associated with the weighted average solution is written as $$\Delta x_A = r\Delta x_1 + (1-r)\Delta x_2 \quad (8)$$

The general expression for the position-error for a weighted least-squares solution is given by $$\Delta x = (G^T W G)^{-1} G^T W \Delta R \quad (9a)$$

$\Delta R$: Ranging error

W: Diagonal matrix whose i$^{th}$ element is the inverse of the variance of the i$^{th}$ ranging error G: Matrix that connects ranging errors into position and receiver clock errors Therefore, $$\Delta x_1 = (G_1^T W_1 G_1)^{-1} G_1^T W_1 \Delta R_1 \quad (9b)$$

$$\Delta x_2 = (G_2^T W_2 G_2)^{-1} G_2^T W_2 \Delta R_2 \quad (9c)$$

The covariance matrix of the error in the measured separation of the GPS solution from the weighted average solution is defined by $$dP_1 \equiv E[(\Delta x_1 - \Delta x_A)(\Delta x_1 - \Delta x_A)^T] \quad (10)$$
$$= E[\Delta x_1 \Delta x_1^T - \Delta x_A \Delta x_1^T - \Delta x_1 \Delta x_A^T + \Delta x_A \Delta x_A^T]$$

Equation (10) is evaluated term-by-term as follows.

$$P_1 \equiv E[\Delta x_1 \Delta x_1^T] = (G_1^T W_1 G_1)^{-1} \quad (11)$$

$$E[\Delta x_A \Delta x_1^T] = rP_1 + (1-r)E[\Delta x_2 \Delta x_1^T] \quad (12)$$

Because GPS and Galileo are independent systems, one may assume that the GPS and Galileo ranging errors are uncorrelated, i.e., $$E[\Delta R_2 \Delta R_1^T] = 0 \quad (13)$$

Then, $$E[\Delta x_2 \Delta x_1^T] = (G_2^T W_2 G_2)^{-1} G_2^T W_2 E[\Delta R_2 \Delta R_1^T] W_1 G_1 (G_1^T W_1 G_1)^{-1} = 0 \quad (14)$$

Therefore, (12) is simplified to $$E[\Delta x_A \Delta x_1^T] = rP_1 \quad (15a)$$

Also, $$E[\Delta x_1 \Delta x_A^T] = rP_1 \quad (15b)$$

Similarly, $$P_A = E[\Delta x_A \Delta x_A^T] = r^2 P_1 + (1-r)^2 P_2 \quad (16)$$

Inserting (11), (15) and (16) into (10) gives $$dP_1 = (1-r)^2(P_1 + P_2) = (1-r)^2 P_S \quad (17)$$

where $P_S \equiv P_1 + P_2$ \quad (18)

Similarly, one can derive $$dP_2 = E[(\Delta x_2 - \Delta x_A)(\Delta x_2 - \Delta x_A)^T] = r^2 P_S \quad (19)$$

Derivation of VPL and HPL as a Function of the Weight Ratio for OWAS-2:

First, the expression for VPL is derived.

Define $$K_{ffd} \equiv Q^{-1}\left(\frac{P_{ffd}}{4}\right) \quad (20a)$$

$$K_{md} \equiv Q^{-1}(P_{md}) \quad (20b)$$

where $Q^{-1}$: Inverse of the complement of the one-sided standard normal cumulative distribution function (CDF) (tail probability)

$P_{ffd}$: Maximum allowable false alert probability $P_{md}$: Maximum allowable missed detection probability Note: $P_{ffd}$ is divided by 4 because the total allowable probability is evenly allocated between vertical and horizontal, each for a two-sided fault-free error distribution Further define, $$\sigma_{V,1} \equiv \sqrt{P_1(3,3)} \quad (21a)$$

$$\sigma_{V,2} \equiv \sqrt{P_2(3,3)} \quad (21b)$$

$$\sigma_{V,S} \equiv \sqrt{P_S(3,3)} = \sqrt{P_1(3,3) + P_2(3,3)} \quad (21c)$$

Then based on (17) and (19), $$\sigma_{dV,1} \equiv \sqrt{dP_1(3,3)} = (1-r)\sqrt{P_S(3,3)} = (1-r)\sigma_{V,S} \quad (21d)$$

$$\sigma_{dV,2} \equiv \sqrt{dP_2(3,3)} = r\sqrt{P_S(3,3)} = r\sigma_{V,S} \quad (21e)$$

With these definitions, and noting that the $VPL_1$ and $VPL_2$ are the sums of the respective thresholds and missed-detection buffers:

$$VPL_1 = T_1 + a_1 = K_{ffd}\sigma_{dV,1} + K_{md}\sigma_{V,1} = (K_{ffd}\sigma_{V,S})(1-r) + K_{md}\sigma_{V,1} \quad (22a)$$

$$VPL_2 = T_2 + a_2 = K_{ffd}\sigma_{dV,2} + K_{md}\sigma_{V,2} = (K_{ffd}\sigma_{V,S})r + K_{md}\sigma_{V,2} \quad (22b)$$

FIG. 8 is graphical illustration 800 of vertical/horizontal protection level as a function of weight ratio. In FIG. 8, $VPL_1$ and $VPL_2$ are linearly decreasing and increasing, respectively, at the same rate as a function of the weight ratio r. In OWAS-2, VPL is selected as $$VPL = \max\{VPL_1, VPL_2\} \quad (23)$$

To obtain the minimum VPL, set $$VPL_1 = VPL_2 \quad (24)$$

From (22a), (22b), and (24), $$r_{\min-VPL} = \frac{1}{2} + \frac{1}{2}\left(\frac{K_{md}}{K_{ffd}}\right)\left(\frac{\sigma_{V,1} - \sigma_{V,2}}{\sigma_{V,S}}\right) \quad (25)$$

Substituting (25) into (22) gives $$VPL = \frac{1}{2}K_{ffd}\sigma_{V,S} + \frac{1}{2}K_{md}(\sigma_{V,1} + \sigma_{V,2}) \quad (26)$$

The weight ratio in (25) gives the smallest VPL. A weight ratio that minimizes HPL can also be derived in a similar manner. In order to satisfy the integrity requirement, recall that VPL and HPL so derived must satisfy both of the following conditions:

$$VPL \leq VAL \quad (27a)$$

$$HPL \leq HAL \quad (27b)$$

Derivation of $\sigma_V$ and $d_{major}$ as a Function of the Weight Ratio for OWAS-2:

The covariance matrix for the weighted average position error, $P_A$, was given earlier by (16):

$$P_A = E[\Delta x_A \Delta x_A^T] = r^2 P_1 + (1-r)^2 P_2 \quad (16)$$

$\sigma_V$ and $d_{major}$ are given, respectively, by $$\sigma_V = \sqrt{P_A(3,3)} \quad (28a)$$

and $$d_{major} = \sqrt{\frac{P_A(1,1) + P_A(2,2)}{2} + \sqrt{\left(\frac{P_A(1,1) - P_A(2,2)}{2}\right)^2 + (P_A(1,2))^2}} \quad (28b)$$

In order for OWAS-2 RAIM to be available, $\sigma_V$ and $d_{major}$ should satisfy the following conditions:

$$\sigma_v \leq \sigma_{v-max} \quad (29a)$$

$$d_{major} \leq d_{major-max} \quad (29b)$$

$\sigma_{V\text{-}max}$ and $d_{major\text{-}max}$ are derived so as to meet the accuracy and fault-free integrity requirements. Note that in the calculations of $P_A$, $\sigma_V$ and $d_{major}$, optimum weight ratios are different in general for vertical and horizontal.

Determination of an Optimal Weight Ratio

As was discussed earlier, there are two ways of selecting a weight ratio: one minimizing VPL, the other maximizing accuracy. If the former choice is selected, the process to determine an optimal weight ratio, takes the following steps. Step 1: If the four inequalities given in (27) and (29) are satisfied, then $r_{min\text{-}VPL}$ is selected as the optimal ratio. OWAS-2 RAIM is declared available. Step 2: If either or both of the two integrity availability inequalities in (27) are not satisfied, then OWAS-2 RAIM is declared unavailable. Step 3: If both integrity availability inequalities in (27) are satisfied, but either or both of the accuracy inequalities in (29) are not satisfied, then one may search for a new weight ratio to satisfy that inequality. A more precise process to determine the new optimal ratio is described below. Note that the optimal ratio needs to be changed only for the vertical or horizontal accuracy requirement that is not attained. Note that if the accuracy requirement is satisfied for only one but not both of vertical and horizontal positions, a new optimal ratio needs to be determined only for the position not yet satisfied.

First, an inequality that a weight ratio must satisfy to meet the accuracy requirement for vertical position is derived.

$$\sigma_V \leq \sigma_{V\text{-}max} \rightarrow P_A(3,3) \leq (\sigma_{V\text{-}max})^2 \rightarrow r^2 P_1(3,3) + (1-r)^2 P_2(3,3) - (\sigma_{V\text{-}max})^2 \leq 0 \qquad (30)$$

Replacing $P_1(3,3)$ and $P_2(3,3)$ with the notations defined earlier, we obtain $$(\sigma_{V,1}^2 + \sigma_{V,2}^2)r^2 - 2\sigma_{V,2}^2 r - [(\sigma_{V\text{-}max})^2 - \sigma_{V,2}^2] \leq 0 \qquad (31)$$

Therefore, $$r_1 \leq r \leq r_2 \qquad (32a)$$

where $$r_1 = \frac{\sigma_{V,2}^2 - \sqrt{\frac{\sigma_{V,2}^4 + (\sigma_{V,1}^2 + \sigma_{V,2}^2)}{[(\sigma_{V\text{-}max})^2 - \sigma_{V,2}^2]}}}{\sigma_{V,1}^2 + \sigma_{V,2}^2} \qquad (32b)$$

and $$r_2 = \frac{\sigma_{V,2}^2 + \sqrt{\frac{\sigma_{V,2}^4 + (\sigma_{V,1}^2 + \sigma_{V,2}^2)}{[(\sigma_{V\text{-}max})^2 - \sigma_{V,2}^2]}}}{\sigma_{V,1}^2 + \sigma_{V,2}^2} \qquad (32c)$$

In addition, as presented earlier in Eq. (7), the weight ratio must also satisfy $$0 \leq r \leq 1 \qquad (7)$$

Therefore, the accuracy requirement can be met only for r that satisfies the inequality $$\text{min-}r_{Vacc} \leq r \leq \text{max-}r_{Vacc} \qquad (33)$$

where $$\text{min-}r_{Vacc} = \max(r_1, 0)$$

$$\text{max-}r_{Vacc} = \min(r_2, 1) \qquad (34)$$

For the option of choosing a weight ratio that would minimize VPL to the extent possible, the weight ratio for vertical is determined, as follows:

If $\text{min-}r_{Vacc} \leq r_{min\text{-}VPL} \leq \text{max-}r_{Vacc}$, then $$\text{Opt\_}r_V = r_{min\text{-}VPL} \qquad (35a)$$

If $r_{min\text{-}VPL} < \text{min-}r_{Vacc}$, then $$\text{Opt\_}r_V = \text{min-}r_{Vacc} \qquad (35b)$$

If $r_{min\text{-}VPL} > \text{max-}r_{Vacc}$, then $$\text{Opt\_}r_V = \text{max-}r_{Vacc} \qquad (35c)$$

If the inequality in (35a) holds, VPL does not need to be re-determined. It is given in (26). However, if the inequality in (35a) does not hold, then VPL needs to be re-determined using $\text{Opt\_}r_V$ from either (35b) or (35c), whichever is applicable. Similar steps are taken to revise the optimal weight ratio for the horizontal position solution ($\text{Opt\_}r_H$).

Then, if both conditions (VPL$\leq$VAL) and (HPL$\leq$HAL) are met for VPL and HPL determined above using $\text{Opt\_}r_V$ and $\text{Opt\_}r_H$, respectively, RAIM is declared available. Otherwise, it is declared unavailable. An optimal weight ratio that maximizes accuracy while still satisfying VPL and HPL criteria can be derived in a similar manner.

OWAS-1 Technique

OWAS-1 is an extension of the OWAS-2 technique, discussed above, but used for different applications. First, OWAS-1 does not require two independent constellations as OWAS-2 does. That is, OWAS-1 works with a single (or multiple constellations combined into one) constellation. Secondly, OWAS-1 provides integrity under the assumption of up to a single satellite fault. For this reason, OWAS-1 is intended to be used, just like all conventional RAIM methods and NIORAIM, for en route, terminal, and NPA phases of flight, for which it may be assumed for the reason discussed earlier that only up to a single satellite fault may occur at any given time. OWAS-1 is similar to NIORAIM in that both OWAS-1 and NIORAIM achieve higher RAIM availability at the expense of less than optimal position accuracy, that is, by trading accuracy for integrity (or equivalently, availability of integrity). However, OWAS-1 differs from NIORAIM in that while NIORAIM derives weights numerically and applies them to the range measurements, OWAS-1 derives weights analytically and applies them to the position estimates. Like all conventional methods, both OWAS-1 and NIORAIM can provide both the RAIM (detection) function and the fault detection and exclusion (FDE) function for en route through NPA phases of flight.

While OWAS-2 deals only with one pair of independent subset solutions, OWAS-1 deals with N ($\geq 5$) correlated subset solutions. However, in order to avoid becoming unwieldy, OWAS-1 considers a horizontal position error along different axes of interest separately. Specifically two orthogonal axes are chosen for OWAS-1 to consider the horizontal position error components: cross track (XTK) and along-track (ATK) as illustrated in FIG. 9.

The first step of OWAS-1 is to identify which pair of subset position solutions is the pair that constrains the protection level (called the "PL-constraining pair") along the selected axis (i.e., XTK or ATK). FIG. 9 illustrates 900 how to select the PL-constraining pair.

Figure 9:
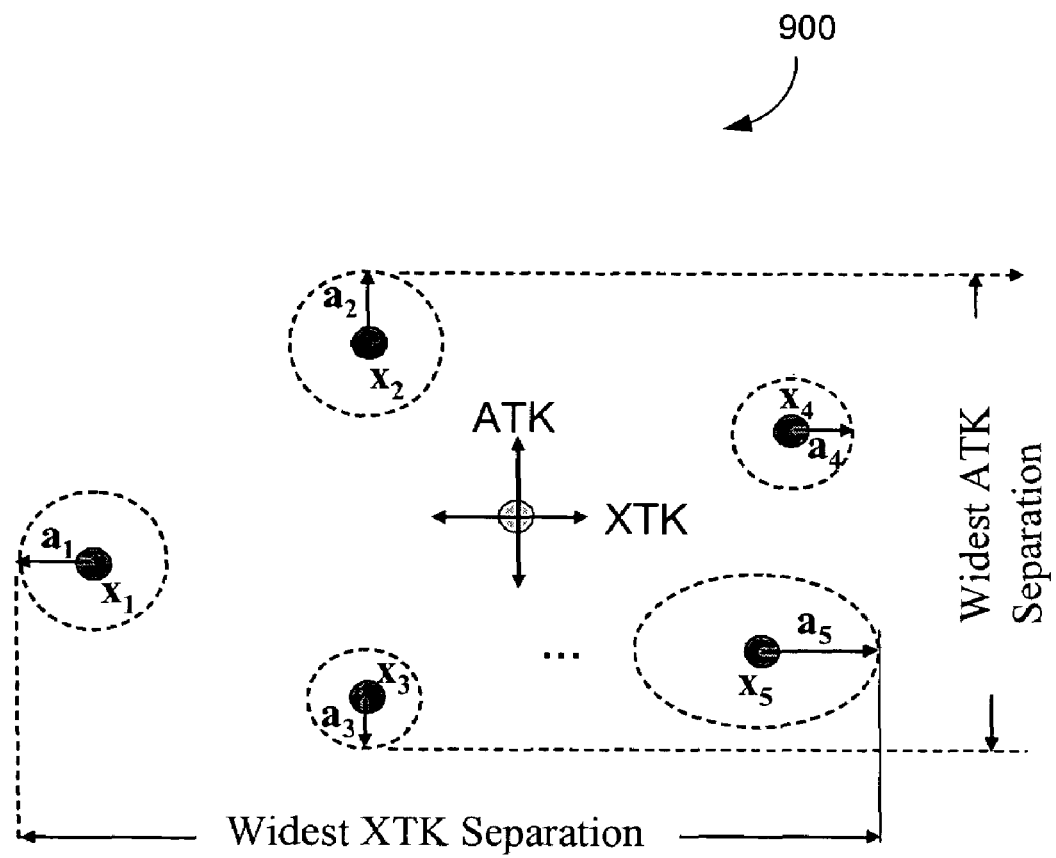
FIG. 9 is a graphical illustration of a protection-level (PL)-constraining pair of subset position solutions in accordance with a second embodiment of the present invention (OWAS-1)

As shown in FIG. 9, a PL-constraining pair is the most widely separated pair among all pairs with the $a_k$ taken into account. (As was discussed for the GS method above, $a_k$ bound the respective position solution errors with a probability that, in combination with an a priori rate of occurrence of a fault, would meet the integrity risk requirement.) For example in FIG. 9, $x_1$ and $x_4$ subset solutions are the most widely separated along the XTK axis, but $x_1$ and $x_5$ are the PL-constraining pair because of $a_5$ being larger than $a_4$. The PL-constraining pair is then used to derive the weighted average solution and the protection level(s) in a manner very much like that with OWAS-2. For the sake of simplicity of notation, the PL-constraining pair of subset solutions (e.g., $x_1$ and $x_5$ for XTK and $x_3$ and $x_2$ for ATK in FIG. 9) are now relabeled as $x_1$ and $x_2$ in the following discussion.

Figure 10:
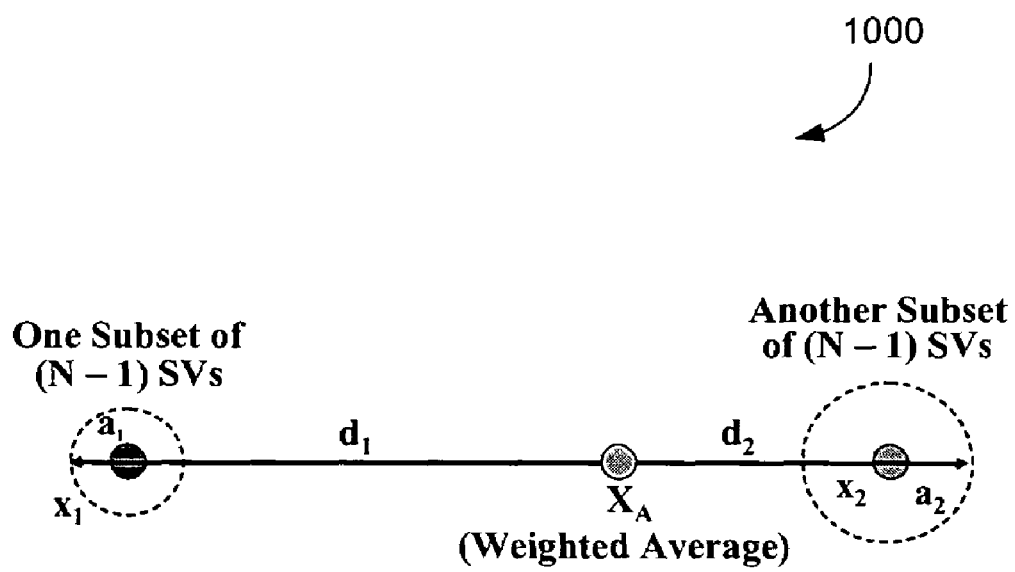
FIG. 10 is an illustration of a weighted average of the selected PL-constraining pair of subset position solutions in accordance with the illustration in FIG. 9.

FIG. 10 is an illustration of a weighted average solution of the two position estimates of the PL-constraining pair 1000 determined in accordance with the illustration in FIG. 9 along each axis. The weighted average solution along each axis constitutes a navigation solution along that axis.

With the above formulation, the optimal weights are derived the same way as for OWAS-2 except for some modifications necessary to take into account the following two factors: (i) $x_1$ and $x_2$ are correlated, and (ii) the horizontal position is considered along the two orthogonal axes, and thus both the protection level and accuracy are likewise considered along those axes: HPL is replaced by the XTK protection level (XPL) and the ATK protection level (APL), and $d_{major}$ is replaced by $\sigma_X$ and $\sigma_A$ representing the standard deviations of the XTK and ATK position errors, respectively. That is, in order for OWAS-1 RAIM to be available for the horizontal position, the following conditions must be satisfied:

$$XPL \leq HAL \text{ and } APL \leq HAL \text{ (integrity)} \quad (36a, b)$$

$$\sigma_X \leq \sigma_{X-max} \text{ and } \sigma_A \leq \sigma_{A-max} \text{ (accuracy)} \quad (37a, b)$$

Note that the vertical position is of no concern for en route through NPA phases of flight, for which OWAS-1 is intended. Also note that the alert limits for position errors along the XTK and ATK are assumed to be identical. The detailed derivations of equations for OWAS-1 are presented below.

Determination of Optimum Weight Ratio for OWAS-1

Trade-off Between Accuracy and Integrity Availability

As in the case with OWAS-2, it is desirable with OWAS-1 to ensure that the accuracy requirement is met along with the integrity requirement when weights are determined. Two options are possible for OWAS-1 in determining the weight (i.e., weight ratio): (1) minimizing HPL (i.e., XPL and APL) while still meeting the accuracy requirement ($\max(\sigma_X, \sigma_A) \leq \sigma_{H-max}$); or (2) minimizing $\max(\sigma_X, \sigma_A)$ while still meeting the integrity availability criterion (XPL$\leq$HAL and APL$\leq$HAL). This trade-off is possible for any pair of subset solutions determined to be the PL-constraining pair.

Evaluation of Availability of Fault Detection and Exclusion (FDE) Function

Just like the conventional RAIM methods, the OWAS-1 Fault Detection and Exclusion (FDE) function is defined as available if the OWAS-1 RAIM detection function is available for every subset of (N−1) satellites where N is the number of satellites being tracked. Therefore, availability of OWAS-1 FDE is evaluated in the following steps:

Step 1: Take one satellite at a time out of N satellites being tracked and create a subset of (N−1) satellites.

Step 2: For the given set obtained in Step 1, determine the PL-constraining pairs along the XTK and ATK axes for a given direction of flight and calculate the optimal weight and the protection level for the selected PL-constraining pair. The protection level and OWAS-1 RAIM detection availability are calculated as described below.

Step 3: Declare OWAS-1 FDE is available if and only if the RAIM detection function is available for every subset of (N−1) satellites.

Selection of Axes for OWAS-1

As described earlier, the first step of OWAS-1 is to determine the PL-constraining subset solution pairs along the XTK and the ATK axes. How to determine the PL-constraining pair was described above with reference to FIG. 9. In the following discussion, it is assumed that the G matrix, which translates ranging errors into position and receiver clock errors, is with respect to the XTK and ATK axes for a given direction of flight. The derivations are shown primarily for XTK because the derivations for ATK are quite similar to those for XTK. Also, vertical is not considered because the vertical position is assumed not provided in this example.

Derivation of Covariance Matrices for OWAS-1

The subset solutions in the PL-constraining pair are labeled as $x_1$ and $x_2$. With this notation, many equations for OWAS-1 will be in the same form as those presented earlier for OWAS-2. The difference comes from the fact that, while the two subset solutions in OWAS-2 are independent, they are correlated in OWAS-1. The procedure to determine an optimal weight that minimizes a protection level and thus maximizes the RAIM availability for the selected pair is described below.

The position solution is a weighted average of the two PL-constraining subset solutions, $x_1$ and $x_2$:

$$x_A = \frac{w_1 x_1 + w_2 x_2}{w_1 + w_2} \quad (38)$$

$$= \left(\frac{w_1}{w_1 + w_2}\right) x_1 + \left(\frac{w_2}{w_1 + w_2}\right) x_2$$

$$= r x_1 + (1 - r) x_2$$

where $$r \equiv \left(\frac{w_1}{w_1 + w_2}\right) \quad (39)$$

From the definition of r in (38), the following must hold:

$$0 \leq r \leq 1 \quad (40)$$

The position error associated with the weighted average solution is written as $$\Delta x_A = r \Delta x_1 + (1-r) \Delta x_2 \quad (41)$$

The general expression for the position error for a weighted least-squares solution is given by $$\Delta x = (G^T W G)^{-1} G^T W \Delta R \quad (42a)$$

where $\Delta R$ is a ranging error vector and W is a diagonal matrix whose $i^{th}$ element is the inverse of the variance of the $i^{th}$ ranging error.

Assume that $x_1$ and $x_2$ are the subset solutions based on all but the $i^{th}$ and $j^{th}$ satellite range measurements, respectively. Then, $$\Delta x_1 = (G_1^T W_1 G_1)^{-1} G_1^T W_1 \Delta R_1 \quad (42b)$$

$$\Delta x_2 = (G_2^T W_2 G_2)^{-1} G_2^T W_2 \Delta R_2 \quad (42c)$$

where $G_1$ and $\Delta R_1$ and $G_2$ and $\Delta R_2$ are G and $\Delta R$ with their $i^{th}$ and $j^{th}$ rows removed, respectively. $G_1$ and $G_2$ are (m−1)×4 matrices, and $\Delta R_1$ and $\Delta R_2$ are (m−1)×1 matrices.

Note that Eqs. (38) through (42c) above for OWAS-1 are expressed in identical forms as Eqs. (6) through (9c) for OWAS-2. The difference is that while $\Delta x_1$ and $\Delta x_2$ for OWAS-2 are independent, those for OWAS-1 are correlated.

$\Delta x_1$ and $\Delta x_2$ can be re-expressed in terms of G and $\Delta R$ (instead of $G_1$ and $\Delta R_1$ or $G_2$ and $\Delta R_2$) as follows by defining matrix $M_i$ and $M_j$ to be an (m×m) identity matrix with the $i^{th}$ and $j^{th}$ diagonal elements zeroed out, respectively. In this case, $\Delta x_1$ can be expressed as follows:

$$\Delta x_1 = (G_1^T W_1 G_1)^{-1} G_1^T W_1 \Delta R_1 \quad (43a)$$
$$= (G^T M_i W G)^{-1} G^T M_i W \Delta R$$

Likewise, $$\Delta x_2 = (G^T M_j W G)^{-1} G^T M_j W \Delta R \quad (43b)$$

The covariance matrix of the error in the measured separation of the solution $x_1$ from the weighted average solution is given by $$dP_1 = E[(\Delta x_1 - \Delta x_A)(\Delta x_1 - \Delta x_A)^T] \quad (44)$$
$$= E[\Delta x_1 \Delta x_1^T - \Delta x_1 \Delta x_A^T - \Delta x_A \Delta x_1^T + \Delta x_A \Delta x_A^T]$$

Eq. (44) is evaluated term by term, as follows.

Define, $$P_{11} = E[\Delta x_1 \Delta x_1^T] \quad (45a)$$

$$P_{12} = E[\Delta x_1 \Delta x_2^T] \quad (45b)$$

$$P_{21} = E[\Delta x_2 \Delta x_1^T] \quad (45c)$$

Note that $$E[\Delta R \Delta R^T] = W^{-1} \quad (46)$$

Using (43) and (45), $$P_{11} = (G^T M_i W G)^{-1} \quad (47)$$

$$P_{12} = (G^T M_i W G)^{-1} (G^T M_i W M_j G)(G^T M_j W G)^{-1} \quad (48)$$

Likewise, $$P_{21} = (G^T M_j W G)^{-1} (G^T M_j W M_i G)(G^T M_i W G)^{-1} \quad (49)$$

Because there are common range measurements used for the two subset solutions, $x_1$ and $x_2$, they are correlated. That is, $$P_{12} \neq 0 \quad (50)$$

In general, $P_{21} \neq P_{12}$ (51)

However, because $P_{21} = P_{12}^T$ $$P_{21}(k,k) = P_{12}(k,k) \text{ for any } k \quad (52)$$

From (41) and (45), $$E[\Delta X_1 \Delta x_A^T] = r P_{11} + (1-r) P_{12} \quad (53a)$$

$$E[\Delta x_A \Delta x_1^T] = r P_{11} + (1-r) P_{21} \quad (53b)$$

Similarly, $$P_A = E[\Delta x_A \Delta x_A^T] = r^2(P_{11} + P_{22} - P_{12} - P_{21}) - (2P_{22} - P_{12} - P_{21})r + P_{22} \quad (54)$$

Inserting Eqs. (45a), (53a), (53b), and (54) into Eq. (44) gives $$dP_1 = (1-r)^2 P_S \quad (55)$$

where $$P_S = P_{11} + P_{22} - P_{12} - P_{21} \quad (56)$$

Similarly, one can derive $$dP_2 = r^2 P_S \quad (57)$$

Derivation of XTK Protection Level (XPL) as a Function of the Weight Ratio

Define, $$\sigma_{X,1} \equiv \sqrt{P_{11}(1,1)} \quad (58a)$$

$$\sigma_{X,2} \equiv \sqrt{P_{22}(1,1)} \quad (58b)$$

$$\sigma_{X,S} \equiv \sqrt{P_S(1,1)} = \sqrt{P_{11}(1,1) + P_{22}(1,1) - 2P_{12}(1,1)} \quad (58c)$$

Then from (55) and (57), $$\sigma_{dX,1} \equiv \sqrt{dP_1(1,1)} = (1-r)\sigma_{X,S} \quad (59a)$$

$$\sigma_{dX,2} \equiv \sqrt{dP_2(1,1)} = r \sigma_{X,S} \quad (59b)$$

With these definitions, and noting that the $XPL_1$ and $XPL_2$ are the sums of the respective thresholds and missed detection buffers, $$XPL_1 = D_1 + a_1 = K_{ffd} \sigma_{dX,1} + K_{md} \sigma_{X,1} = (K_{ffd} \sigma_{X,S})(1-r) + K_{md} \sigma_{X,1} \quad (60a)$$

$$XPL_2 = D_2 + a_2 = K_{ffd} \sigma_{dX,2} + K_{md} \sigma_{X,2} = (K_{ffd} \sigma_{X,S}) r + K_{md} \sigma_{X,2} \quad (60b)$$

where $K_{ffd}$ and were defined earlier in (20a) and (20b). Note that in (20a), $P_{ffd}$ is again divided by 4 in OWAS-1 because the total allowable probability is evenly allocated between XTK and ATK, each for a two-sided fault-free error distribution.

Note that $XPL_1$ and $XPL_2$ above are linearly decreasing and increasing, respectively, at the same rate as a function of the weight ratio r.

XPL is selected as $$XPL = \max\{XPL_1, XPL_2\} \quad (61)$$

To obtain the minimum XPL, set $$XPL_1 = XPL_2 \quad (62)$$

From Eqs. (60a), (60b), and (62), $$r_{min-XPL} = \frac{1}{2} + \frac{1}{2}\left(\frac{K_{md}}{K_{ffd}}\right)\left(\frac{\sigma_{X,1} - \sigma_{X,2}}{\sigma_{X,S}}\right) \quad (63)$$

Substituting Eq. (63) into Eqs. (60a) and (60b) and then (61), $$XPL = \frac{1}{2} K_{ffd} \sigma_{X,S} + \frac{1}{2} K_{md}(\sigma_{X,1} + \sigma_{X,2}) \quad (64)$$

The weight ratio in (64) provides the smallest XPL. A weight ratio that minimizes APL can also be derived in a similar manner.

In order to satisfy the integrity requirement, recall that XPL and APL must satisfy both of the following conditions:

$$XPL \leq HAL \tag{65a}$$

$$APL \leq HAL \tag{65b}$$

Derivations of Navigation Solution Accuracy as a Function of Weight Ratio for OWAS-1

The standard deviations of the XTK and ATK position errors can be denoted as $\sigma_X$ and $\sigma_A$. They are derived from the covariance matrix for the weighted average position error, $P_A$ in Eq. (54).

From $P_A$, $$\sigma_X = \sqrt{P_A(1,1)} \tag{66a}$$

$$\sigma_A = \sqrt{P_A(2,2)} \tag{66b}$$

In order for RAIM to be available for horizontal position, $\sigma_X$ and $\sigma_A$ are required to satisfy the following conditions:

$$\sigma_X \leq \sigma_{X\text{-}max} \tag{67a}$$

$$\sigma_A \leq \sigma_{A\text{-}max} \tag{67b}$$

where $\sigma_{X\text{-}max}$ and $\sigma_{A\text{-}max}$ are derived so as to meet the accuracy and fault-free integrity requirements:

$$\sigma_{X\text{-}max} = \sigma_{A\text{-}max} = \min\{95\% \text{ horizontal accuracy}/1.96, HAL/K_H\} \tag{68}$$

Determination of an Optimum Weight Ratio for OWAS-1

As for the case with OWAS-2, there are two ways of selecting a weight ratio: one minimizing XPL (or APL) to the extent possible while still meeting the XTK (or ATK) accuracy requirement, and the other, minimizing $\sigma_X$ (or $\sigma_A$) to the extent possible while still meeting the integrity availability requirement XPL$\leq$HAL (or APL$\leq$HAL). The processes to determine the optimal weight ratios with the two options are similar. In the following, the process to determine the weight ratios with the former option is described below as an example:

Step 1: If the four inequalities given in Eqs. (65) and (67) are satisfied, then RAIM is declared available.

Step 2: If either or both of the two integrity availability inequalities in Eq. (65) are not satisfied, then RAIM is declared unavailable.

Step 3: If both integrity availability inequalities in Eq. (65) are satisfied, but either or both of the accuracy inequalities in Eq. (67) are not satisfied, then one may search for a new weight ratio to satisfy that inequality. A more precise process to determine the new optimal ratio is described below. Note that if the accuracy requirement is satisfied for only one axis but not both XTK and ATK, a new optimal ratio needs to be determined only for the axis not yet satisfied.

First, an inequality that a weight ratio must satisfy to meet the accuracy requirement for XTK position is derived.

From Eqs. (66a) and (67a)

$$P_A(1,1) < (\sigma_{X\text{-}max})^2 \tag{69}$$

From Eqs. (54), (56), and (52), $$P_A(1,1) = P_S(1,1)r^2 - 2[P_{22}(1,1) - P_{12}(1,1)]r + P_{22}(1,1) \tag{70}$$

Define $$B_X = P_{22}(1,1) - P_{12}(1,1) \tag{71}$$

Then, replacing $P_S(1,1)$ and $P_{22}(1,1)$ with the notations defined earlier in (58), we obtain $$P_A(1,1) = \sigma_{X,S}^2 r^2 - 2B_X r + \sigma_{X,2}^2 \tag{72}$$

Inserting (72) into (69), we obtain $$\sigma_{X,S}^2 r^2 - 2B_X r - [(\sigma_{X\text{-}max})^2 - \sigma_{X,2}^2] < 0 \tag{73}$$

Therefore, $$r_1 < r < r_2 \tag{74}$$

where $$r_1 = \frac{B_X - \sqrt{B_X^2 + \sigma_{X,S}^2[(\sigma_{X\text{-}max})^2 - \sigma_{X,2}^2]}}{\sigma_{X,S}^2} \tag{75b}$$

and $$r_2 = \frac{B_X + \sqrt{B_X^2 + \sigma_{X,S}^2[(\sigma_{X\text{-}max})^2 - \sigma_{X,2}^2]}}{\sigma_{X,S}^2} \tag{75c}$$

In addition, as presented earlier in (40), the weight ratio must also satisfy $$0 \leq r \leq 1$$

Therefore, the XTK accuracy requirement can be met only for weight ratio r that satisfies the inequality $$\min\text{-}r_{Xacc} < r < \max\text{-}r_{Xacc} \tag{76a}$$

where $$\min\text{-}r_{Xacc} = \max(r_1, 0)$$

$$\max\text{-}r_{Xacc} = \min(r_2, 1) \tag{77b}$$

For the option of choosing a weight ratio that would minimize XPL to the extent possible, the weight ratio for XTK is determined as follows:

If $\min\text{-}r_{Xacc} \leq r_{min\text{-}XPL} \leq \max\text{-}r_{Xacc}$, then $\text{Opt\_}r_X = r_{min\text{-}VPL}$ (78a)

If $r_{min\text{-}XPL} < \min\text{-}r_{Xacc}$, then $\text{Opt\_}r_X = \min\text{-}r_{Xacc}$ (78b)

If $r_{min\text{-}XPL} > \max\text{-}r_{Xacc}$, then $\text{Opt\_}r_X = \max\text{-}r_{Xacc}$ (78c)

If $r_{min\text{-}VPL}$ satisfies the inequality in (78a), XPL does not need to be recalculated; it is given in Eq. (64). However, if the inequality in (78a) does not hold, then XPL is recalculated using Opt_rX in either Eq. (78b) or Eq. (78c), whichever is applicable, using Eqs. (61a), (60b), and (61). For ATK, both Opt_$r_A$, and APL are also recalculated in a similar manner if necessary.

If both XPL and APL recalculated above satisfy the conditions (XPL$\leq$HAL) and (APL$\leq$HAL) respectively, RAIM is declared available. Otherwise, it is declared not available.

Figure 11A:
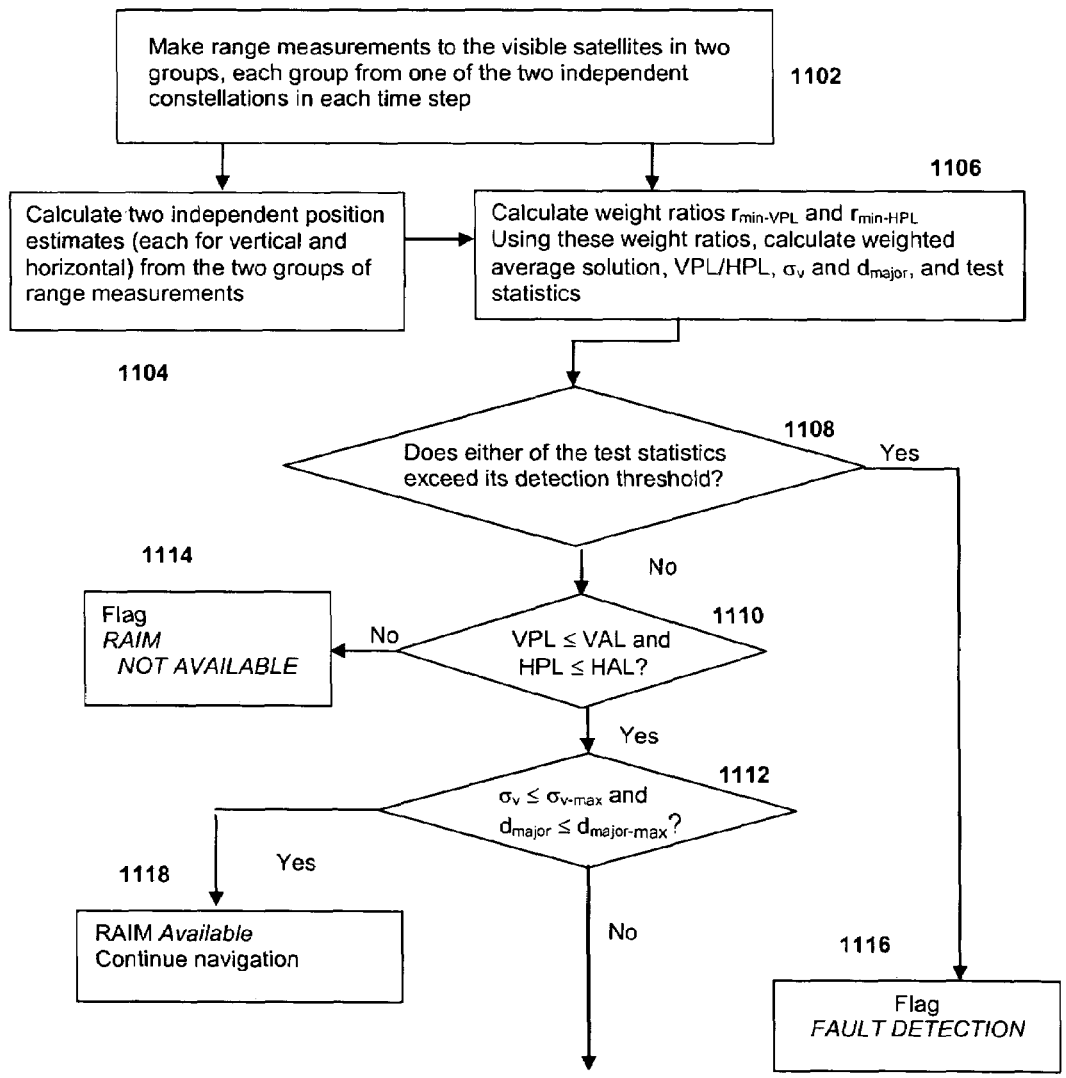
FIG. 11A is an exemplary flowchart of a method of practicing the first embodiment of the present invention.
Figure 11B:
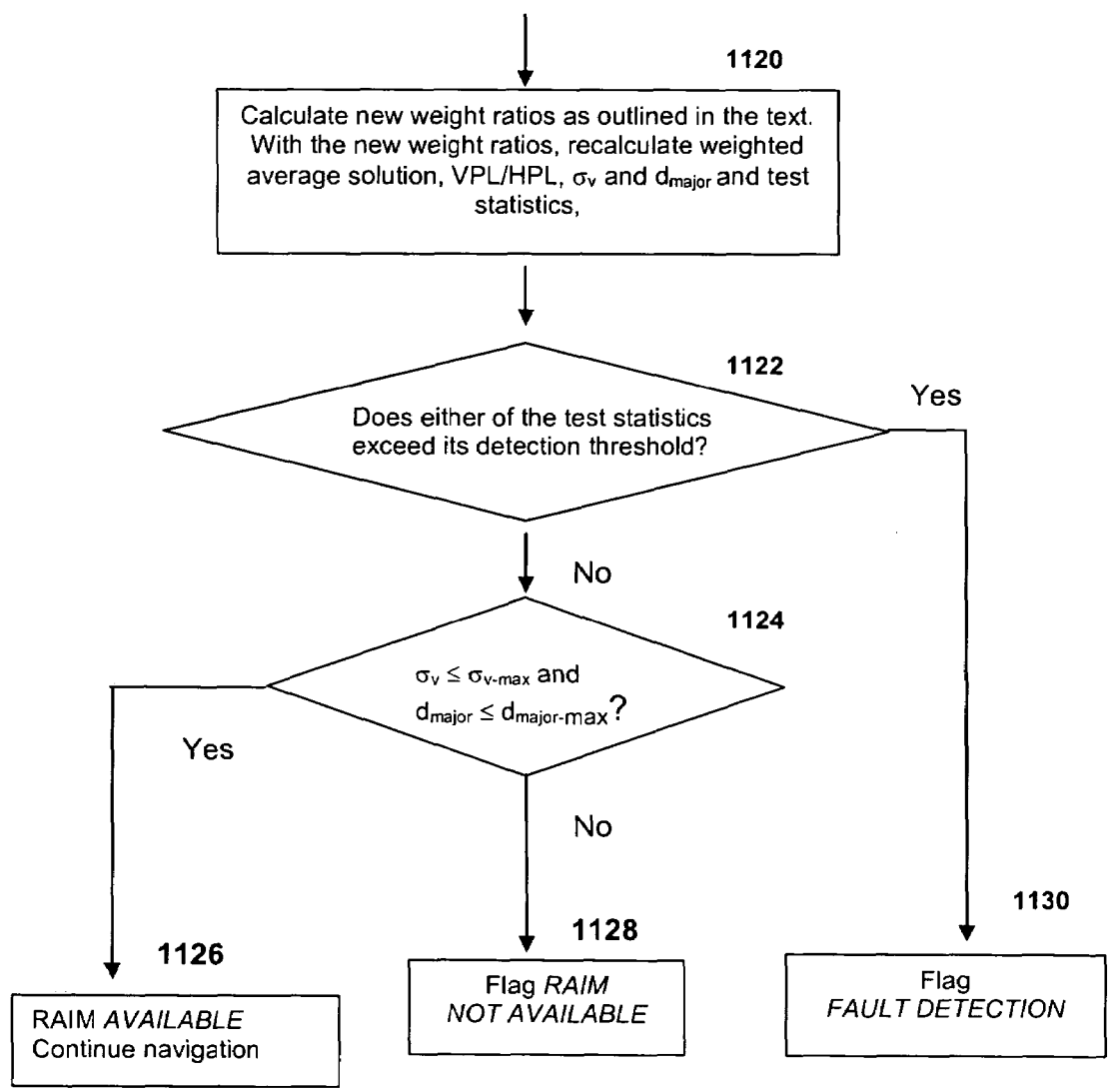
FIG. 11B is a continuation of the exemplary flowchart of FIG. 11A.

FIGS. 11A and 11B are an exemplary flow diagram 1100 representative of a method of practicing the first embodiment of the present invention, OWAS-2. Out of the two options for OWAS-2 in selecting an optimal weight ratio. FIGS. 11A and 11B are a flow diagram for the option of providing the smallest protection levels as much as possible. In FIGS. 11A and 11B, an occurrence of satellite signal faults (either single or multiple) in either one of the GNSSs is determined. Whether RAIM is or is not available is assessed on the basis of the optimal weight ratio maximizing the RAIM availability.

More specifically, in FIGS. 11A and 11B, range measurements are made to the visible satellites in two groups, each group from one of two independent constellations in each time step, as indicated in step 1102. In step 1104, two independent position estimates are calculated (each for vertical and horizontal) from the two groups of range measurements.

In step 1106, weight ratios are calculated for the initial selection. With these weights, the following parameters are calculated: the weighted average solution, VPL, HPL, standard deviations for vertical and horizontal ($\sigma_V$ and $d_{major}$) and the test statistics (for vertical and horizontal) for fault detection. In step 1108, if either test statistic exceeds its detection threshold, a "fault detected" flag is raised, as indicated in step 1116. If neither test statistic of the step 1108 exceeds its detection threshold, VPL and HPL are compared with the corresponding alert limits. If either protection level exceeds its alert limit, then a "RAIM is not available" flag is raised as indicated in step 1114. If both protection levels are within the corresponding alert limits, parameters $\sigma_V$ and $d_{major}$ are compared with their maximum allowable values, as indicated in step 1112. If both $\sigma_V$ and $d_{major}$ are within the respective limits, then RAIM is available, as indicated in step 1118, and navigation continues using the weighted average solution.

If either $\sigma_V$ or $d_{major}$ exceeds its limit, then a new set of weight ratios is calculated and the following parameters are also calculated with these new weight ratios: the weighted average solution, VPL, HPL, standard deviations for vertical and horizontal ($\sigma_V$ and $d_{major}$) and the test statistics (for vertical and horizontal) for fault detection 1120. If either test statistic exceeds its detection threshold 1122, a "fault detected" flag is raised, as indicated in step 1130. If neither test statistic of step 1124 exceeds its detection threshold, $\sigma_V$ and $d_{major}$ are compared with their maximum allowable values. If both $\sigma_V$ and $d_{major}$ are within their respective limits, then RAIM is available and navigation continues 1126; otherwise, a "RAIM not available" flag is raised 1128.

Figure 12A:
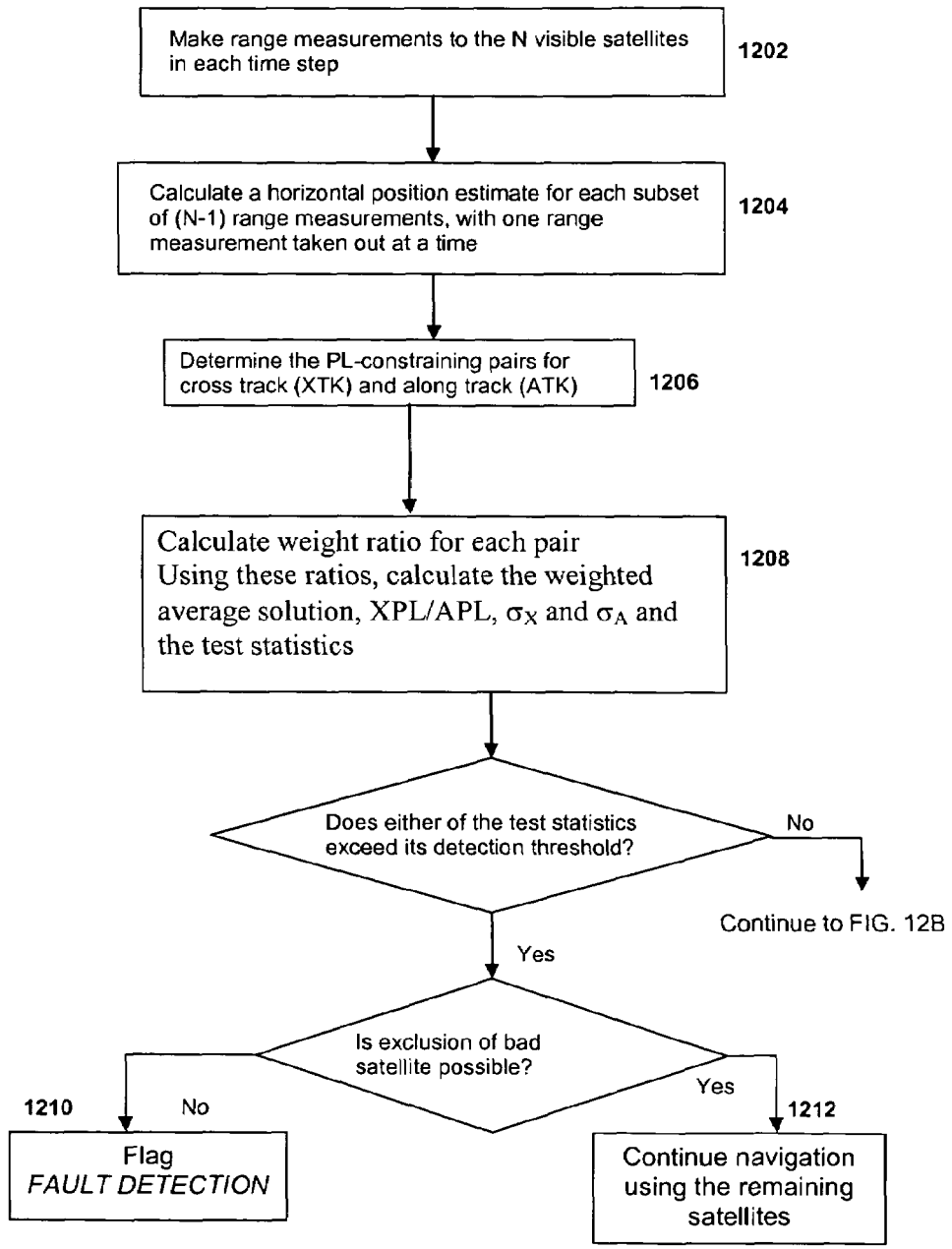
FIG. 12A is an exemplary flowchart of a method of practicing the second embodiment of the present invention.
Figure 12B:
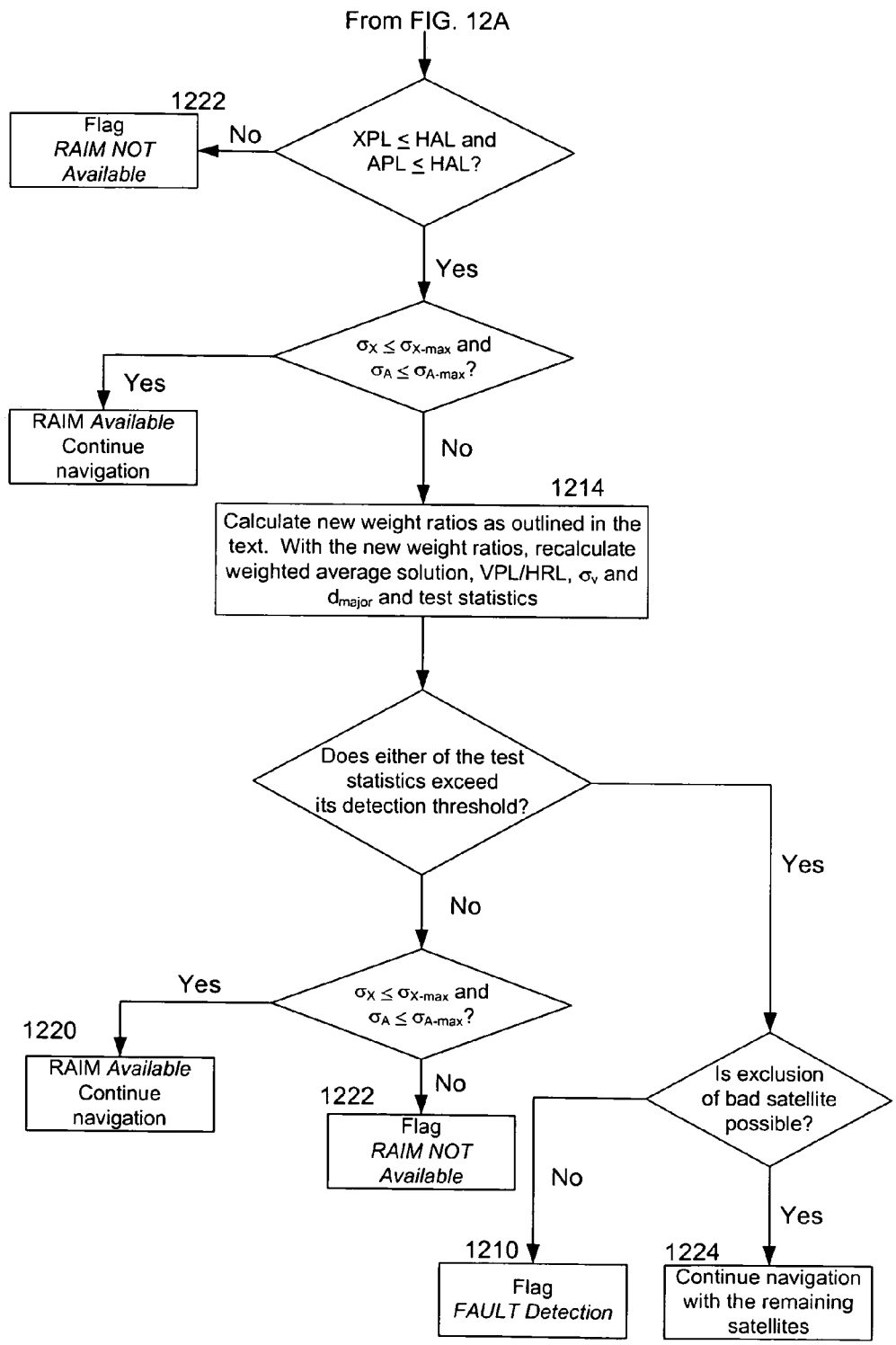
FIG. 12B is a continuation of the exemplary flowchart of FIG. 12A.

FIGS. 12A and 12B are an exemplary flow diagram 1200 representative of a method of practicing the second embodiment of the present invention, OWAS-1. In OWAS-1, range measurements are made to the N visible satellites in each time step, as indicated in step 1202. A horizontal position estimate for each subset of (N−1) range measurements is calculated, with one range measurement taken out at a time, as shown in step 1204. This generates a number (N) of correlated subset position estimates ($X_k$), where (N) is a number of satellites being in view of the user out of those from the one or more GNSSs.

Next, in step 1206, from the N subset position estimates, a protection level constraining pair is identified along each of the XTK and ATK axes. For the two protection level constraining pairs identified, a pair of optimal weights is determined as described earlier. With these weights, the following parameters are calculated: the weighted average solutions (XTK and ATK), XPL and APL, the standard deviations for vertical and horizontal ($\sigma_X$ and $\sigma_A$), and the test statistics 1208. If either of the two test statistics exceeds its respective fault detection threshold, an attempt to isolate and exclude the bad satellite is made if the FDE function is available. If the FDE attempt is not successful 1210, a fault detection is declared and the user must take an appropriate action according to an operational procedure; if the FDE attempt is successful, then the navigation may continue with the remaining visible satellites 1212.

If neither test statistic exceeds its threshold, the XPL and APL are compared with HAL. If both XPL and APL are less than or equal to HAL and also both $\sigma_X \leq \sigma_{X\text{-}max}$ and $\sigma_A \leq \sigma_{A\text{-}max}$, then RAIM is declared available and the navigation continues using the weighted average solution 1222. If either XPL or APL exceeds HAL, then the user is alerted that RAIN is not available. If both XPL$\leq$HAL and APL$\leq$HAL, but either $\sigma_X$ or $\sigma_A$ exceeds its maximum allowable value, then a new weight ratio is calculated as described earlier, and with the new weight ratios, the following parameters are recalculated: the weighted average solutions (XTK and ATK), XPL and APL, the standard deviations for vertical and horizontal, and the test statistics 1214. If either one of the test statistics newly calculated exceeds its detection threshold, an attempt to isolate and exclude the bad satellite may be made if the FDE function is available.

If the FDE attempt is not successful, a fault detection is declared 1210 and the user must take an appropriate action according to an operational procedure. If the FDE attempt is successful, then the navigation may continue with the remaining visible satellites 1224. If neither test statistic exceeds its threshold, the newly calculated $\sigma_X$ and $\sigma_A$ are compared with their respective maximum allowable values. If $\sigma_X \leq \sigma_{X\text{-}max}$ and $\sigma_A \leq \sigma_{A\text{-}max}$, then RAIN is declared available and the navigation continues 1220. Otherwise RAIM is declared unavailable 1222.

The present invention can apply to a broad range of users. Exemplary users, to name a few, can include aircraft, ships, land vehicles, or even space vehicles. For aircraft navigation, this includes localizer performance with vertical guidance (LPV), approach with precision vertical guidance (APV)-II. Other types of aircraft navigation include future precision approaches equivalent to that of the guidance provided by the Instrument Landing System (ILS) for CAT I, II and III. It even includes Real Time Kinematic (RTK) navigation with a differential system for land survey.

The present invention can also work with different types of satellite ranging signal sources including code phase measurements and carrier phase measurements, each with or without differential corrections.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for facilitating vertical and horizontal guidance for mobile users using two or more independent global navigation satellite systems (GNSSs), comprising:

detecting an occurrence of one or more satellite signal faults in either one of the two independent GNSS constellations when two or more satellites become faulty simultaneously, the detecting occurring at a substantially consistent detection probability in accordance with any specified detection probability requirement; and deriving vertical protection levels (VPLs) and horizontal protection levels (HPLs) by trading accuracy for integrity;

wherein the detecting and deriving are (i) in position domain and (ii) determinative of safety of the mobile user.

2. The method of claim 1, wherein undetected satellite signal faults create misleading information.

3. The method of claim 2, wherein the deriving is such that by trading accuracy for integrity, (i) a probability of hazardously misleading information (HMI) (Pr{HMI}) being made smaller or (ii) availability of integrity monitoring can be made higher for a given Pr{HMI} integrity requirement;

wherein availability is a percentage of time that the integrity monitoring is available, the integrity monitoring ensuring safety of the mobile user.

4. The method of claim 1, wherein the facilitating is independent of the user, type of navigation, and type of ranging signal sources.

5. The method of claim 1, wherein the HPLs and VPLs are continuously determined in real time.

6. The method of claim 1, wherein the HPLs and VPLs are derived in accordance with specified integrity requirements.

7. The method of claim 1, wherein a GNSS can be any one of (i) the Global Positioning System (GPS), (ii) the Galileo system, and (iii) the GLONASS.

8. The method of claim 1, further comprising assessing horizontal position and vertical position, wherein the assessing for horizontal position is based upon any assumed two-dimensional error distribution.

9. The method of claim 8, wherein the assessing for vertical position is based upon any assumed single-dimensional error distribution.

10. The method of claim 8, wherein the assessing includes obtaining at least three user mobile user position estimates for a given user-to-satellite geometry.

11. The method of claim 10, wherein two estimates are derived from measurements from the two independent GNSS constellations, a third estimate being a weighted average of the first two; and wherein the weights are chosen to minimize the protection levels and maximize the RAIM availability for vertical and horizontal positions, respectively.

12. The method of claim 11, wherein the third estimate is used for navigation, error for this estimate being bounded by the vertical and horizontal protection levels.

13. A method for facilitating mobile user navigation in which guidance is required, using a global navigation satellite system (GNSS), comprising:

detecting an occurrence of a satellite signal fault in a GNSS constellation; and deriving protection levels by trading navigation accuracy for higher navigation integrity when determining a navigation solution;

wherein the trading includes combining two solutions with an optimized weight ratio from each pair of subset solutions.

14. The method of claim 13, wherein an undetected satellite signal fault creates misleading information.

15. The method of claim 14, wherein the deriving is such that by trading accuracy for integrity, (i) a probability of hazardously misleading information (HMI) Pr{HMI} being made smaller or (ii) availability of integrity monitoring can be made higher for a given Pr{HMI} integrity requirement; and wherein availability is a percentage of time that integrity monitoring capability is available, the integrity monitoring capability ensuring mobile user safety.

16. The method of claim 13, wherein the mobile user navigation in which either (i) horizontal guidance or (ii) both horizontal and vertical guidance are required.

17. The method of claim 13, wherein the protection levels are continuously determined in real time.

18. The method of claim 13, wherein the protection levels are derived in accordance with specified integrity requirements.

19. The method of claim 13, wherein a GNSS can be any one or a combination of (i) the Global Positioning System (GPS), (ii) the Galileo system, and (iii) the GLONASS.

20. The method of claim 13, further comprising assessing horizontal position and vertical position, wherein the assessing the horizontal position is based upon any assumed single-dimensional error distribution along cross track (XTK) and along-track (ATK) axes, respectively; and wherein the assessing for vertical position, if vertical position is required for the application, is based on any assumed single-dimensional error distribution along the vertical axis.

21. The method of claim 13, wherein the assessing includes obtaining at least (N+1) user position estimates.

22. The method of claim 21, wherein i) first N estimates are derived, each from (N−1) measurements out of the measurements from N satellites in view, and ii) the last $(N+1)^{th}$ estimate is a weighted average of a selected pair of estimates from the first N estimates.

23. The method of claim 22, wherein a first pair of estimates is most widely separated among all pairs of estimates along a cross track (XTK) axis; and wherein a second pair of the estimates is the most widely separated among all pairs of estimates along an along-track (ATK) axis.

24. The method of claim 22, wherein the $(N+1)^{th}$ estimate is used for navigation, an error for this estimate being bounded by protection levels minimized by the present invention.

25. The method of claim 23, wherein the deriving includes deriving cross-track and along-track protection levels for horizontal position.

26. The method of claim 25, wherein a third pair of the estimates can be determined along the vertical axis to derive VPL if vertical guidance is provided.

27. The method of claim 13, wherein the facilitating is independent of the user, type of navigation, and type of ranging signal sources.

28. The method of claim 13, wherein the detecting and deriving are (i) in position domain and (ii) determinative of mobile user safety.

* * * * *